US009482864B2

(12) United States Patent
Shimizu

(10) Patent No.: US 9,482,864 B2
(45) Date of Patent: *Nov. 1, 2016

(54) OPTICAL SCANNER, ACTUATOR, IMAGE DISPLAY DEVICE, AND HEAD-MOUNTED DISPLAY

(71) Applicant: Seiko Epson Corporation, Tokyo (JP)

(72) Inventor: Takeshi Shimizu, Chino (JP)

(73) Assignee: Seiko Epson Corporation (JP)

( * ) Notice: Subject to any disclaimer, the term of this patent is extended or adjusted under 35 U.S.C. 154(b) by 208 days.

This patent is subject to a terminal disclaimer.

(21) Appl. No.: 14/202,607

(22) Filed: Mar. 10, 2014

(65) Prior Publication Data

US 2014/0268270 A1    Sep. 18, 2014

(30) Foreign Application Priority Data

Mar. 18, 2013 (JP) ................................ 2013-055728

(51) Int. Cl.
*G02B 26/08* (2006.01)
*G02B 26/10* (2006.01)
*G02B 27/01* (2006.01)

(52) U.S. Cl.
CPC ............ *G02B 26/10* (2013.01); *G02B 26/085* (2013.01); *G02B 27/0176* (2013.01); *H02K 11/24* (2016.01)

(58) Field of Classification Search
CPC ............ G02B 26/101; G02B 26/105; G02B 26/0858; G02B 26/0841; G02B 26/085; G02B 26/0833; G02B 26/10; G02B 2027/014; G02B 27/01; G02B 27/0176; G01C 1915/09; G01C 1915/1907; G01C 1915/0915; G01C 19/5719; G01C 19/5729; G01C 1915/0922; G01C 19/5747; G01C 19/5712

USPC .................. 359/221.2–221.3, 224.1–224.2
See application file for complete search history.

(56) References Cited

U.S. PATENT DOCUMENTS 6,278,538 B1    8/2001   Schleipen
6,952,304 B2   10/2005   Mushika et al.
7,088,492 B2    8/2006   Yanagita et al.
(Continued)

FOREIGN PATENT DOCUMENTS

DE   10 2006 051 197 A1    5/2008
DE       102007033000    *  1/2009
(Continued)

OTHER PUBLICATIONS

Extended European Search Report for Application No. EP 14 15 9860 dated Jun. 12, 2014 (7 pages).
(Continued)

*Primary Examiner* — James Phan
(74) *Attorney, Agent, or Firm* — Harness, Dickey & Pierce, P.L.C.

(57) ABSTRACT

An optical scanner includes: a movable member having a light reflection portion and being configured to swing around a first axis; a frame body configured to swing around a second axis intersecting the first axis; a first shaft connecting the movable member and the frame body; a fixing member; a second shaft connecting the frame body and the fixing member; a first strain detection element disposed at the second shaft and detecting deformation of the second shaft; and a first signal processing unit to which a detection signal of the first strain detection element is input and which outputs a signal based on bending deformation of the second shaft.

20 Claims, 13 Drawing Sheets

(56) References Cited

U.S. PATENT DOCUMENTS

| | | |
|---|---|---|
| 7,442,918 B2 | 10/2008 | Sprague et al. |
| 2002/0044327 A1 | 4/2002 | Fujita et al. |
| 2010/0079837 A1 | 4/2010 | Akedo et al. |
| 2011/0199284 A1 | 8/2011 | Davis et al. |
| 2014/0268267 A1* | 9/2014 | Shimizu .............. G02B 26/101 359/200.2 |

FOREIGN PATENT DOCUMENTS

| | | |
|---|---|---|
| EP | 1 708 004 A1 | 10/2006 |
| JP | 2002-040358 A | 2/2002 |
| JP | 2003-057570 A | 2/2003 |
| JP | 2003-185949 A | 7/2003 |
| JP | 2003-207737 A | 7/2003 |
| JP | 2004-226548 A | 8/2004 |
| JP | 2005-181576 A | 7/2005 |
| JP | 2007-522529 A | 8/2007 |
| JP | 2008-116678 A | 5/2008 |
| JP | 2010-097092 A | 4/2010 |
| JP | 2010-164954 A | 7/2010 |
| JP | 2012-053269 A | 3/2012 |
| WO | WO-02061488 A1 | 8/2002 |
| WO | WO-2005078509 A2 | 8/2005 |

OTHER PUBLICATIONS

Ikeda, Masaaki et al., "Two Dimensional Silicon Micromachined Optical Scanner Integrated With Photo Detector and Piezoresistor", OMRON Corporation, Central R&D Laboratory, Japan, vol. 1, Jun. 25, 1995, pp. 293-296.

Extended European Search Report for Application No. EP 14 15 9816 dated Mar. 20, 2015 (9 pages).

\* cited by examiner

FIRST VOLTAGE
(HORIZONTAL SCANNING DRIVE SIGNAL)

SECOND VOLTAGE
(VERTICAL SCANNING DRIVE SIGNAL)

OPTICAL SCANNER, ACTUATOR, IMAGE DISPLAY DEVICE, AND HEAD-MOUNTED DISPLAY

BACKGROUND

1. Technical Field

The present invention relates to an optical scanner, an actuator, an image display device, and a head-mounted display.

2. Related Art

An optical scanner which is used in a projector, a head-mounted display, and the like and which two-dimensionally scans light is known (for example, see JP-A-2003-207737).

An optical scanner described in JP-A-2003-207737 includes an outer frame (fixing portion), an inner frame (frame body portion) which is provided at an inner side of the outer frame, a pair of second elastic beams (second shaft portions) which rotatably supports the inner frame against the outer frame, a mirror portion (movable portion) which is provided at an inner side of the inner frame, and a pair of first elastic beams (first shaft portions) which rotatably supports the mirror portion against the inner frame.

In the optical scanner, the inner frame is made to rotate with respect to the outer frame while torsionally deforming the second elastic beams, and the mirror portion is made to rotate with respect to the inner frame while torsionally deforming the first elastic beams. According to this, two-dimensional scanning with light reflected by the mirror portion is carried out.

In addition, in the optical scanner described in JP-A-2003-207737, a piezoresistor is disposed over the first elastic beams between the mirror portion and the inner frame. According to this, rotation of the mirror portion due to twist deformation of the first elastic beams can be detected based on variation in a resistance value of the piezoresistor.

In the optical scanner described in JP-A-2003-207737, since the piezoresistor is provided over the first elastic beams between the mirror portion and the inner frame, it is necessary to dispose an interconnection for supplying power to the piezoresistor or an interconnection for taking-out a detection signal of the piezoresistor throughout the entire region over the second elastic beams between the inner frame and the outer frame.

As described above, when the interconnection is formed over the entire region over the second elastic beams, the interconnection passes over a portion at which an amount of deformation due to the torsion of the second elastic beams becomes the maximum, the interconnection receives repetitive stress due to the torsional deformation of the elastic beams, and thus there is a problem that the interconnection may be disconnected.

SUMMARY

An advantage of some aspects of the invention is to provide an optical scanner and an actuator which are capable of detecting movement of a movable portion by using a strain detection element while suppressing a disconnection of an interconnection connected to the strain detection element, and to provide an image display device and a head-mounted display which are provided with the optical scanner and which are excellent in reliability.

An aspect of the invention is directed to an optical scanner including a movable portion (member) which is provided with a light reflection portion having a light reflection property, and which is configured to swing around a first axis, a frame body portion which is configured to swing around a second axis intersecting the first axis, a first shaft portion which connects the movable portion and the frame body portion, a fixing portion (member), a second shaft portion which connects the frame body portion and the fixing portion, a first strain detection element which is disposed at the second shaft portion and detects deformation of the second shaft portion, and a first signal processing unit to which a detection signal of the first strain detection element is input and which outputs a signal based on bending deformation of the second shaft portion.

According to the optical scanner, the movement of the movable portion around the first axis can be detected based on the signal output from the first signal processing unit. In addition, since the first strain detection element is disposed at the second shaft portion, it is not necessary to dispose an interconnection which is connected to the first strain detection element throughout the entire region of the second shaft portion in a longitudinal direction. Accordingly, it is possible to suppress disconnection of the interconnection.

In the optical scanner of the aspect of the invention, it is preferable that movement of the movable portion around the first axis is detected based on the signal output from the first signal processing unit.

According to this configuration, it is possible to control the movement of the movable portion around the first axis based on the movement which is detected in order for the movement to enter a desired state, or it is possible to synchronize the movement of the movable portion around the first axis and the operation of other devices.

In the optical scanner of the aspect of the invention, it is preferable that the first strain detection element includes a piezoresistive region having a rectangular shape extending in a direction along a longitudinal direction of the second shaft portion, and a pair of terminals collinearly disposed in a line on the piezoresistive region in a direction along the longitudinal direction of the second shaft portion.

According to this configuration, it is possible to intensify a signal which is included in a signal output from the first strain detection element and which is based on the bending deformation of the second shaft portion.

In the optical scanner of the aspect of the invention, it is preferable that the first strain detection element is disposed at an end of the second shaft portion on a fixing portion side (proximate the fixing portion).

According to this configuration, it is possible to reduce a portion, which is disposed at the second shaft portion, of an interconnection connected to the first strain detection element.

In the optical scanner of the aspect of the invention, it is preferable that the movement of the movable portion around the first axis is estimated (using an observer) based on the signal output from the first signal processing unit.

According to this configuration, even when the swing of the movable portion around the first axis does not enter a resonant state, it is possible to detect the movement of the movable portion around the first axis based on the signal which is output from the first signal processing unit.

In the optical scanner of the aspect of the invention, it is preferable that the movement of the movable portion around the first axis may be estimated based on the signal output from the first signal processing unit by using a ratio between an amplitude at a resonance frequency relating to swinging of the movable portion around the first axis, and an amplitude at a resonance frequency relating to swinging of the frame body portion around the first axis.

According to this configuration, it is possible to detect the movement of the movable portion around the first axis with high accuracy with a relatively simple configuration based on the signal which is output from the first signal processing unit.

In the optical scanner of the aspect of the invention, it is preferable that the optical scanner further includes a second strain detection element which is disposed at the second shaft portion and detects deformation of the second shaft portion, and a second signal processing unit to which a detection signal of the second strain detection element is input and which outputs a signal based on torsional deformation of the second shaft portion.

According to this configuration, it is possible to detect the movement of the movable portion around the second axis based on a signal which is output from the second signal processing unit.

In the optical scanner of the aspect of the invention, it is preferable that movement of the movable portion around the second axis is detected based on the signal output from the second signal processing unit.

According to this configuration, it is possible to control the movement of the movable portion around the second axis based on the movement which is detected in order for the movement to enter a desired state, or it is possible to synchronize the movement of the movable portion around the second axis and an operation of other devices.

Another aspect of the invention is directed to an optical scanner including a movable portion (member) which is provided with a light reflection portion having a light reflection property, and which is configured to swing around a first axis, a frame body portion which is configured to swing around a second axis intersecting the first axis, a first shaft portion which connects the movable portion and the frame body portion, a fixing portion (member), and a second shaft portion which connects the frame body portion and the fixing portion. A strain detection element is disposed only at the second shaft portion.

According to the optical scanner, the movement of the movable portion around the first axis can be detected based on a detection signal of the strain detection element. In addition, it is not necessary to dispose an interconnection which is connected to the strain detection element throughout the entire region of the second shaft portion in a longitudinal direction. Accordingly, it is possible to suppress disconnection of the interconnection.

Still another aspect of the invention is directed to an actuator having a gimbal structure which swingably supports a movable portion (member) around a first axis by a first shaft portion supported against a frame body portion on an inner side of the frame body portion, and which swingably supports the frame body portion around a second axis intersecting the first axis by a second shaft portion on an outer side of the frame body portion. The actuator includes a strain detection element which is disposed at the second shaft portion and detects deformation of the second shaft portion. Movement of the movable portion around the first axis is detected using a signal which is included in a detection signal of the strain detection element and is based on bending deformation of the second shaft portion.

According to the actuator, the movement of the movable portion around the first axis can be detected based on a detection signal of the strain detection element. In addition, it is not necessary to dispose an interconnection which is connected to the strain detection element throughout the entire region of the second shaft portion in a longitudinal direction. Accordingly, it is possible to suppress disconnection of the interconnection.

Yet another aspect of the invention is directed to an image display device including the optical scanner of the aspect of the invention, and a light source that emits light. Light emitted from the light source is reflected by the light reflection portion to display an image.

According to this configuration, it is possible to provide an image display device excellent in reliability.

Still yet another aspect of the invention is directed to a head-mounted display including the optical scanner of the invention, and a light source that emits light. The light emitted from the light source is reflected by the light reflection portion to display an image as a virtual image.

According to this configuration, it is possible to provide a head-mounted display excellent in reliability.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

Hereinafter, the preferred embodiments of an optical scanner, an actuator, an image display device, and a head-mounted display will be described with reference to the attached drawings. In addition, in the following description, an example of a case in which the actuator according to the invention is applied to the optical scanner will be described, but the actuator according to the invention is not limited to these cases, and is applicable to other optical devices such as an optical switch and an optical attenuator.

Optical Scanner

Figure 1:
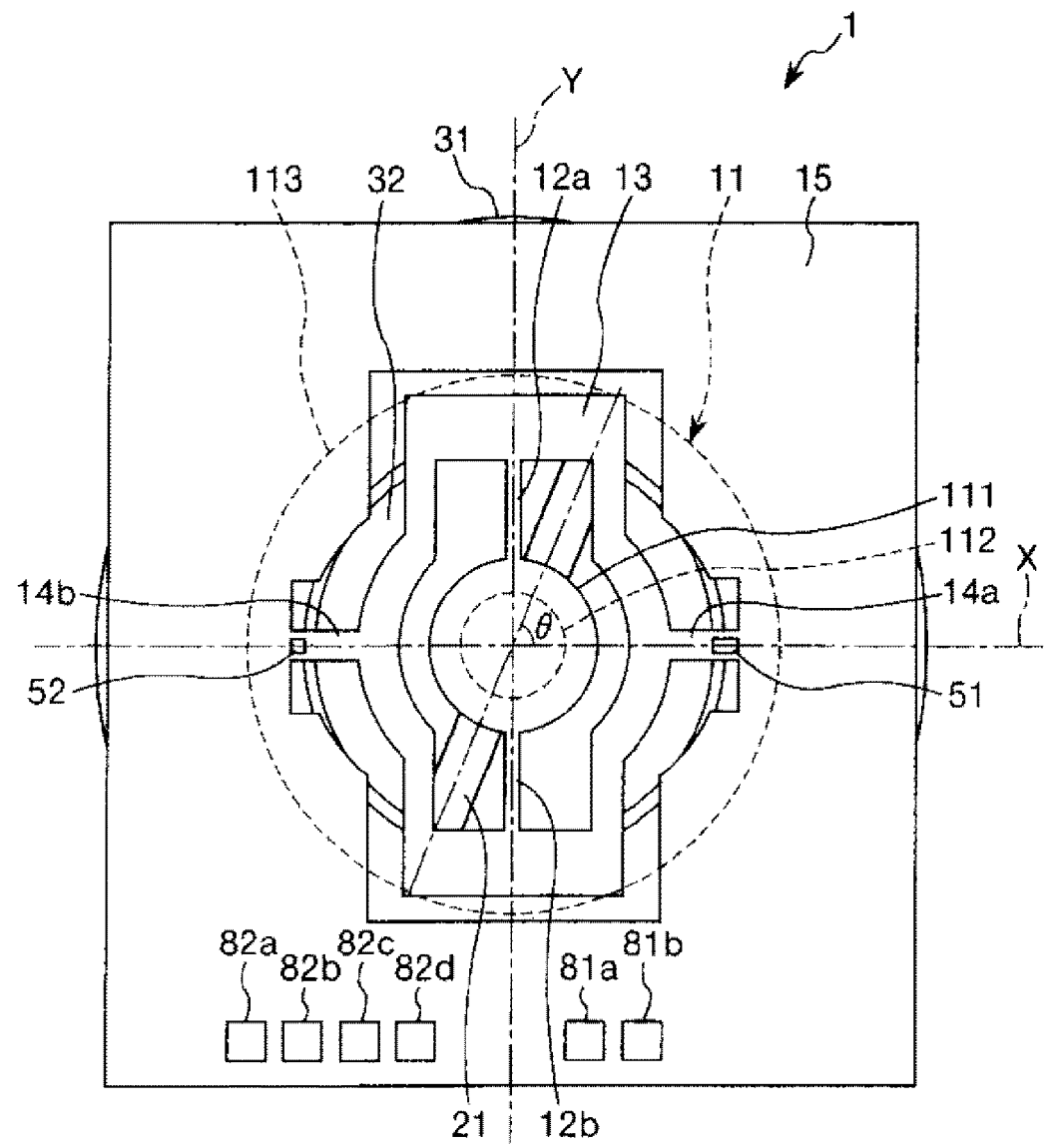
FIG. 1 is a plan view illustrating an optical scanner according to an embodiment of the invention.
Figure 2:
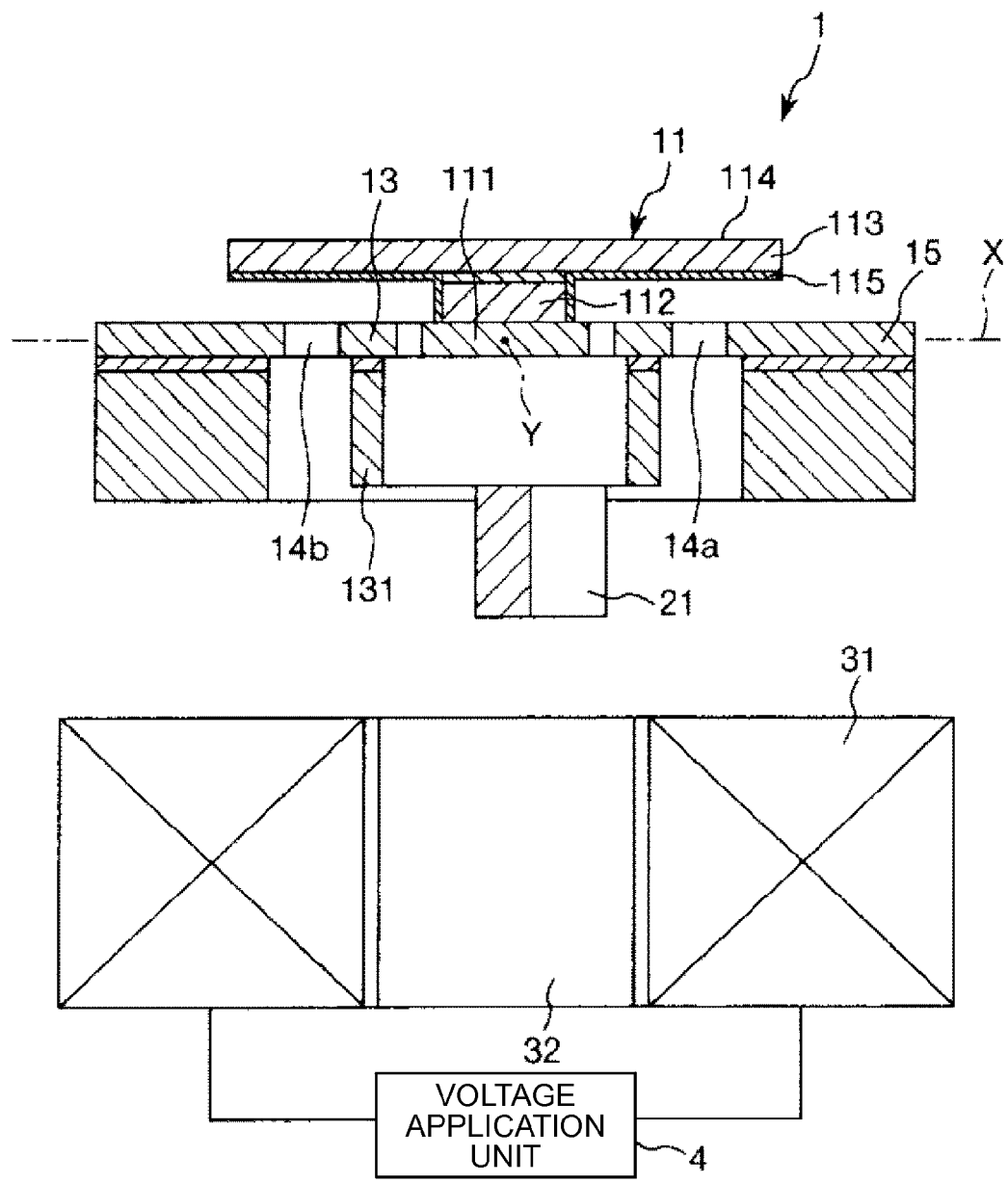
FIG. 2 is a cross-sectional view (cross-sectional view along an X-axis) of the optical scanner shown in FIG. 1.
Figure 3:
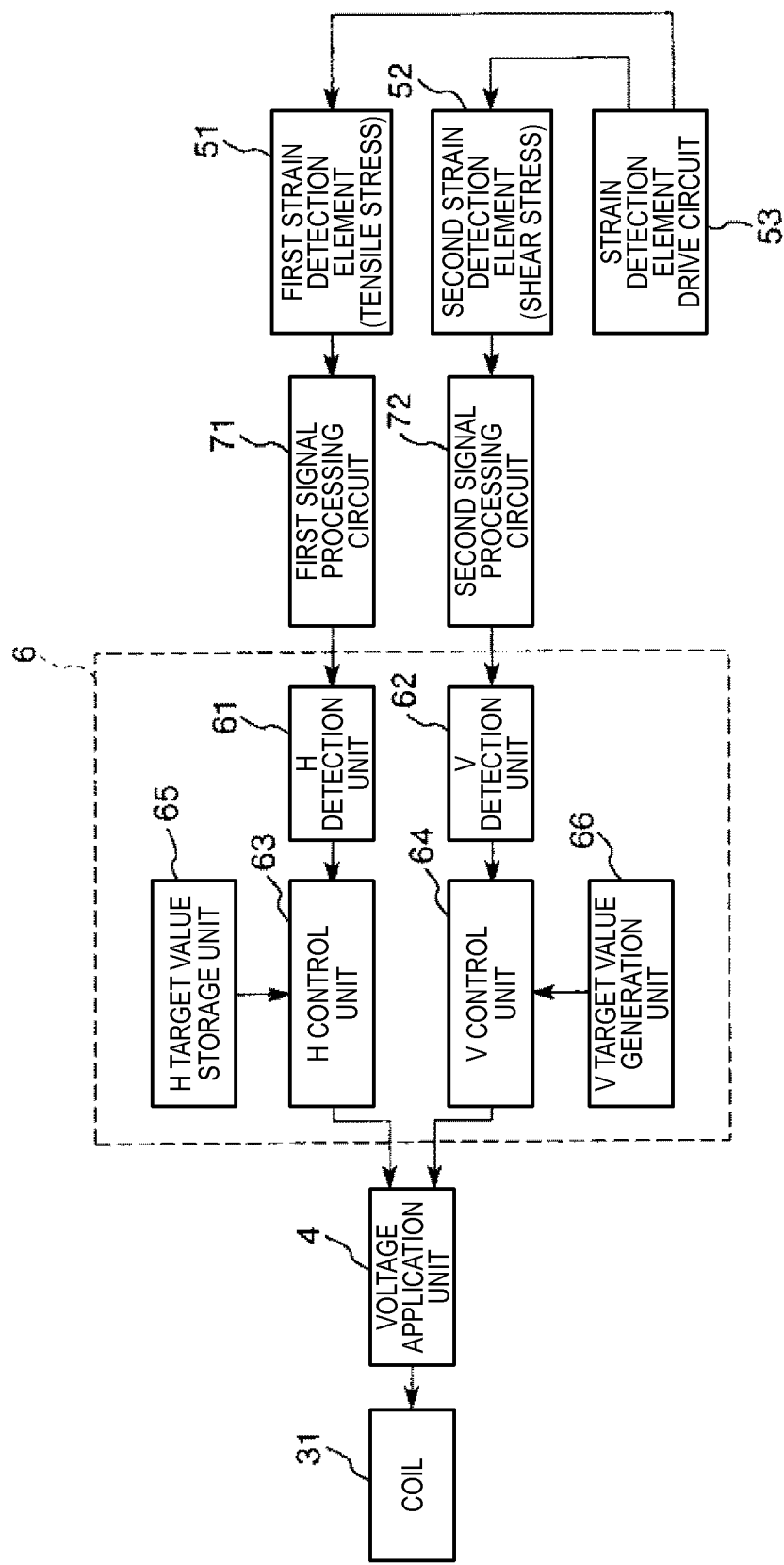
FIG. 3 is a block diagram illustrating a control system of the optical scanner shown in FIG. 1.
Figure 4:
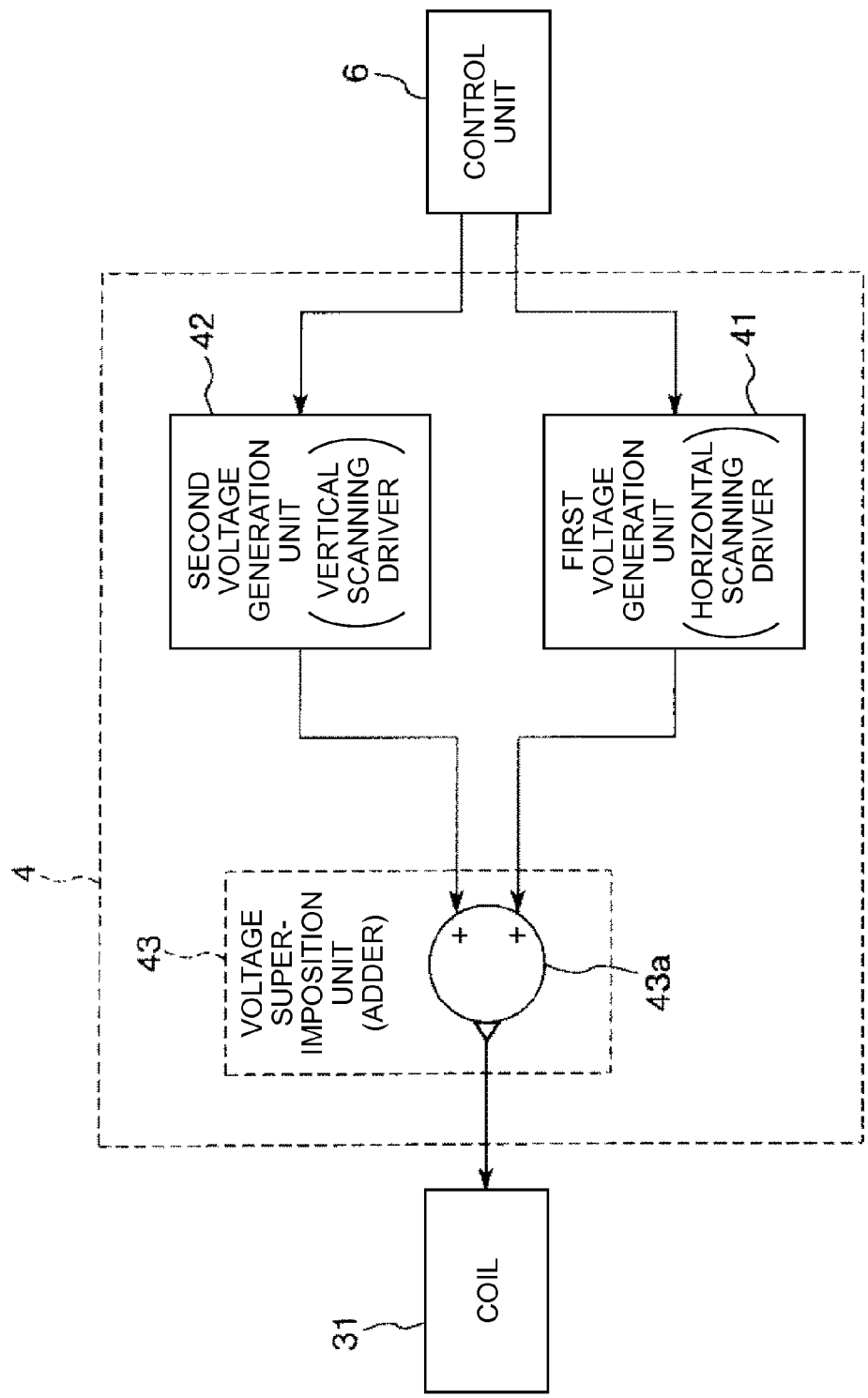
FIG. 4 is a block diagram illustrating a voltage application unit of a drive unit which is provided to the optical scanner shown in FIG. 1.
Figure 5A:
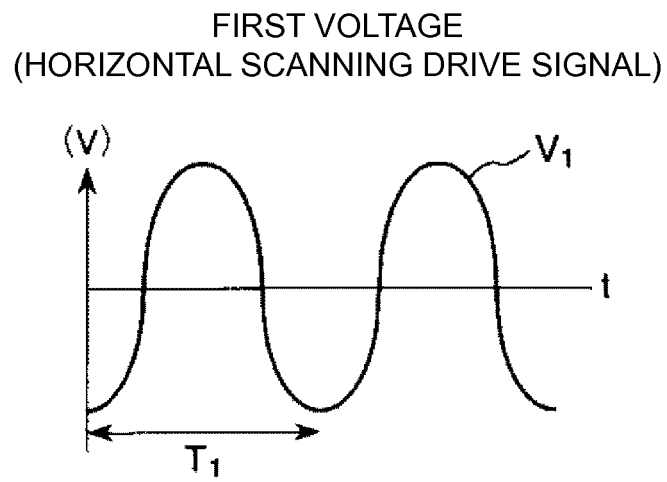
FIGS. 5A and 5B are views illustrating an example of a voltage generated at a first voltage generation unit and a second voltage generation unit which are shown in FIG. 4.
Figure 5B:
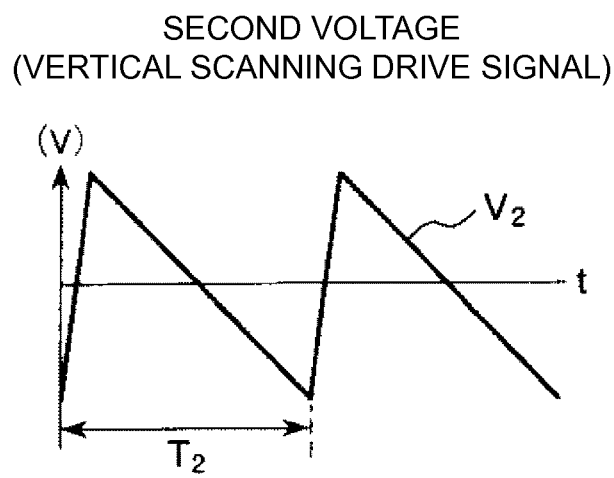

FIG. 1 shows a plan view illustrating an optical scanner according to an embodiment of the invention, FIG. 2 is a cross-sectional view (cross-sectional view along an X-axis) of the optical scanner shown in FIG. 1, and FIG. 3 is a block diagram illustrating a control system of the optical scanner shown in FIG. 1. In addition, FIG. 4 is a block diagram illustrating a voltage application unit of a drive unit which is provided to the optical scanner shown in FIG. 1, FIGS. 5A and 5B are views illustrating an example of a voltage generated at a first voltage generation unit and a second voltage generation unit which are shown in FIG. 4.

In addition, in the following description, an upper side and a lower side in FIG. 2 are referred to as "over" and "below", respectively.

As shown in FIGS. 1 and 2, an optical scanner 1 includes a movable mirror portion 11, a pair of shaft portions 12a and 12b (first shaft portions), a frame body portion 13, a pair of shaft portions 14a and 14b (second shaft portions), a fixing portion 15, a permanent magnet 21, a coil 31, a magnetic core 32, a voltage application unit 4, a strain detection element 51 (first strain detection element), and a strain detection element 52 (second strain detection element).

Here, the movable mirror portion 11, and the pair of shaft portions 12a and 12b constitute a first vibration system which swings (reciprocally rotates) around a Y-axis (first axis). In addition, the movable mirror portion 11, the pair of shaft portions 12a and 12b, the frame body portion 13, the pair of shaft portions 14a and 14b, and the permanent magnet constitute a second vibration system which swings (reciprocally rotates) around an X-axis (second axis).

In addition, the permanent magnet 21, the coil 31, and the voltage application unit 4 constitute a drive portion which drives the above-described first vibration system and the second vibration system (that is, makes the movable mirror portion 11 swing around the X-axis and the Y-axis) due to mutual operation of magnetic fields of the permanent magnet 21 and the coil 31.

Specifically, in the optical scanner 1, the strain detection element 51 is disposed to the shaft portion 14a, and thus a detection signal of the strain detection element 51 includes a signal based on a bending deformation of the shaft portion 14a. As shown in FIG. 3, the detection signal is input to a first signal processing circuit 71. The first signal processing circuit 71 outputs a signal based on bending deformation of the shaft portion 14a. The signal output from the first signal processing circuit 71 is input to a control unit 6. The control unit 6 detects movement of the movable mirror portion 11 around the Y-axis based on the signal output from the first signal processing circuit 71. As described above, the movement of the movable mirror portion 11 around the Y-axis is detected using the signal which is included in the detection signal of the strain detection element 51 and which is based on the bending deformation of the shaft portion 14a. According to this, it is not necessary to dispose an interconnection (not shown) which is connected to the strain detection element 51 at the shaft portions 12a and 12b, or it is not necessary to dispose the interconnection throughout the entire region in a longitudinal direction of the shaft portion 14a or 14b. As a result, it is possible to suppress disconnection of the interconnection.

In addition, the strain detection element 52 is disposed at the shaft portion 14b, and thus a detection signal of the strain detection element 52 includes a signal based on a torsional deformation of the shaft portion 14b. As shown in FIG. 3, the detection signal is input to a second signal processing circuit 72. The second signal processing circuit 72 outputs a signal based on bending deformation of the shaft portion 14b. The signal output from the second signal processing circuit 72 is input to the control unit 6. The control unit 6 detects movement of the movable mirror portion 11 around the X-axis based on the signal output from the second signal processing circuit 72. As described above, the movement of the movable mirror portion 11 around the X-axis is detected using the signal which is included in a signal output from the strain detection element 52 and which is based on the torsional deformation of the shaft portion 14b.

Hereinafter, respective portions of the optical scanner 1 will be sequentially described in detail.

The movable mirror portion 11 includes a base portion (movable portion) 111, and a light reflection plate 113 which is fixed to the base portion 111 through a spacer 112. Here, the base portion (movable portion) 111 has a swing (rotation) function with respect to the fixing portion 15.

A light reflection portion 114 having a light reflection property is provided on an upper surface (one surface) of the light reflection plate 113.

The light reflection plate 113 is spaced away from the shaft portions 12a and 12b in a plate thickness direction of the light reflection plate 113, and is provided to overlap the shaft portions 12a and 12b when seen in the plate thickness direction (hereinafter, also referred to as a "plan view").

Accordingly, it is possible to increase an area of a plate surface of the light reflection plate 113 while shortening a distance between the shaft portions 12a and 12b. In addition, since the distance between the shaft portions 12a and 12b can be shortened, miniaturization of the frame body portion 13 can be realized. Further, since miniaturization of the frame body portion 13 can be realized, it is possible to shorten the distance between the shaft portions 14a and 14b.

According to this, even when the area of the plate surface of the light reflection plate 113 is increased, it is possible to realize miniaturization of the optical scanner 1.

In addition, the light reflection plate 113 is formed to cover the entirety of the shaft portions 12a and 12b in a plan view. In other words, the shaft portions 12a and 12b are located on an inner side of the outer periphery of the light reflection plate 113 in a plan view. According to this, the area of the plate surface of the light reflection plate 113 increases, and as a result, it is possible to increase the area of the light reflection portion 114. In addition, it is possible to suppress unnecessary light (for example, light which is not incident to the light reflection portion 114) that is reflected on the shaft portions 12a and 12b and thus becomes stray light.

In addition, the light reflection plate 113 is formed to cover the entirety of the frame body portion 13 in a plan view. In other words, the frame body portion 13 is located on an inner side of the outer periphery of the light reflection plate 113 in a plan view. According to this, the area of the plate surface of the light reflection plate 113 increases, and as a result, it is possible to increase the area of the light reflection portion 114. In addition, it is possible to suppress unnecessary light that is reflected on the frame body portion 13 and thus becomes stray light.

Further, the light reflection plate 113 is formed to cover the entirety of the shaft portions 14a and 14b in a plan view. In other words, the shaft portions 14a and 14b are located on an inner side of the outer periphery of the light reflection plate 113 in a plan view. According to this, the area of the plate surface of the light reflection plate 113 increases, and as a result, it is possible to increase the area of the light reflection portion 114. In addition, it is possible to suppress unnecessary light that is reflected on the shaft portions 14a and 14b, and thus becomes stray light.

In this embodiment, the light reflection plate 113 has a circular shape in a plan view. The shape of the light reflection plate 113 in a plan view is not limited to the circular shape, and may have a polygonal shape such as an elliptical shape or a rectangular shape. In addition, when the shape of the light reflection plate 113 in a plan view is set to a shape which protrudes in directions along the X-axis and the Y-axis, it is possible to effectively reduce the stray light at each of the shaft portions while suppressing a moment of inertia of the light reflection plate 113.

A hard layer 115 is provided on a lower surface (the other surface, a surface of the light reflection plate 113 on a base portion 111 side) of the light reflection plate 113.

The hard layer 115 is formed from a material harder than a constituent material of the main body of the light reflection plate 113. According to this, it is possible to enhance the rigidity of the light reflection plate 113. As a result, it is possible to suppress bending of the light reflection plate 113 during swinging. In addition, when the thickness of the light reflection plate 113 is made small, it is possible to suppress a moment of inertia during swinging around the X-axis and the Y-axis of the light reflection plate 113.

There is no particular limitation to a constituent material of the hard layer 115 as long as the constituent material is harder than the constituent material of the main body of the light reflection plate 113. As the constituent material of the hard layer 115, for example, diamond, quartz, sapphire, lithium tantalate, potassium niobate, carbon nitride film, and the like may be used, and particularly, diamond is preferably used.

Although not particularly limited, the thickness (average) of the hard layer 115 is preferably approximately 1 μm to 10 μm, and more preferably approximately 1 μm to 5 μm.

In addition, the hard layer 115 may be configured as a single layer, or may be configured as a laminated body of a plurality of layers. In addition, the hard layer 115 may be provided to the entirety of the lower surface of the light reflection plate 113 or a part of the lower surface. In addition, the hard layer 115 is provided as desired, and thus may be omitted.

When forming the hard layer 115, for example, a chemical vapor deposition (CVD) method such as plasma CVD, thermal CVD, and laser CVD, a dry plating method such as vacuum deposition, sputtering, and ion plating, wet plating method such as electrolytic plating, immersion plating, and electroless plating, thermal spraying, bonding of a sheet-shaped member, and the like may be used.

In addition, the lower surface of the light reflection plate 113 is fixed to the base portion 111 through the spacer 112. According to this, it is possible to make the light reflection plate 113 swing around the Y-axis while suppressing contact between the shaft portions 12a and 12b, the frame body portion 13, and the shaft portions 14a and 14b.

In addition, the base portion 111 is located on an inner side of the outer periphery of the light reflection plate 113 in a plan view. In addition, it is preferable that an area of the base portion 111 in a plan view is as small as possible, as long as the base portion 111 can support the light reflection plate 113 through the spacer 112. According to this, it is possible to shorten a distance between the shaft portion 12a and the shaft portion 12b while increasing the area of the plate surface of the light reflection plate 113.

The frame body portion 13 has a frame shape, and is provided to surround the base portion 111 of the movable mirror portion 11. In other words, the base portion 111 of the movable mirror portion 11 is provided on an inner side of a frame body portion 13 having a frame shape.

In a plan view, the frame body portion 13 has a shape conforming to an external shape of a structure constituted by the base portion 111 of the movable mirror portion 11 and the pair of shaft portions 12a and 12b. According to this, miniaturization of the frame body portion 13 is realized while making vibration of a first vibration system constituted by the movable mirror portion 11 and the pair of shaft portions 12a and 12b, that is, swing of the movable mirror portion 11 around the Y-axis.

In addition, the frame body portion 13 includes a rib 131 which further protrudes in a thickness direction of the frame body portion 13 in comparison to the shaft portions 12a and 12b and the shaft portions 14a and 14b. It is possible to reduce deformation of the frame body portion 13 due to the rib 131. In addition, the rib 131 also has a function (function as a spacer) of suppressing contact of the movable mirror portion 11 with the permanent magnet 21.

The shape of the frame body portion 13 is not limited to the shape shown in the drawing as long as it is within a frame shape.

In addition, the length of the frame body portion 13 in a direction along the Y-axis is longer than the length thereof in a direction along the X-axis. According to this, it is possible to shorten the length of the optical scanner 1 in a direction along the X-axis while securing a length desired for the shaft portions 12a and 12b.

In addition, the frame body portion 13 is supported against the fixing portion 15 through the shaft portions 14a and 14b. In addition, the base portion 111 of the movable mirror portion 11 is supported against the frame body portion 13 through the shaft portions 12a and 12b.

The shaft portions 12a and 12b and the shaft portions 14a and 14b are elastically deformable, respectively.

In addition, the shaft portions 12a and 12b (first shaft portions) connect the movable mirror portion 11 and the frame body portion 13 in such a manner that the movable mirror portion 11 can swing (rotate) around the Y-axis (first axis). In addition, the shaft portions 14a and 14b (second shaft portions) connect the frame body portion 13 and the fixing portion 15 in such a manner that the frame body portion 13 can swing around (rotate) around the X-axis (second axis) perpendicular to the Y-axis.

More specifically, the shaft portions 12a and 12b are disposed to face each other with the base portion 111 of the movable mirror portion 11 interposed therebetween.

In addition, the shaft portions 12a and 12b have a rectangular shape (rod shape) which extends in a direction along the Y-axis, respectively. In addition, one end of each of the shaft portions 12a and 12b is connected to the base portion 111 and the other end thereof is connected to the frame body portion 13. In addition, the shaft portions 12a and 12b are disposed in such a manner that the central axis of each of the shaft portions 12a and 12b coincides with the Y-axis.

In this manner, the shaft portions 12a and 12b support the base portion 111 of the movable mirror portion 11 from both sides of the base portion 111. In addition, the shaft portions 12a and 12b are torsionally deformed along with the swing of the movable mirror portion 11 around the Y-axis, respectively.

The shape of the shaft portions 12a and 12b is not limited to the above-described shape as long as the shaft portions 12a and 12b are configured to support the movable mirror portion 11 against the frame body portion 13 in order for the movable mirror portion 11 to swing around the Y-axis. For example, a bent or curved portion, a diverged portion, or a portion having a different width may be provided at least at one portion partway along the shaft portions 12a and 12b.

The shaft portions 14a and 14b are disposed to face each other through the frame body portion 13.

In addition, the pair of shaft portions 14a and 14b is disposed along the X-axis in a plan view, and has a rectangular shape (rod shape) along the X-axis. In addition, one end of each of the shaft portions 14a and 14b is connected to the frame body portion 13 and the other end thereof is connected to the fixing portion 15. In addition, the shaft portions 14a and 14b are disposed in such a manner that the central axis of each of the shaft portions 14a and 14b coincides with the X-axis.

In this manner, the shaft portions 14a and 14b support the frame body portions 13 from both sides of the frame body portion 13. In addition, the shaft portions 14a and 14b are torsionally deformed along with the swing of the frame body portion 13 around the X-axis.

The shape of the shaft portions 14a and 14b is not limited to the above-described shape as long as the shaft portions 14a and 14b are configured to support the frame body portion 13 against the fixing portion 15 in order to swing around the X-axis. For example, a bent or curved portion, a diverged portion, or a portion having a different width may be provided at least at one portion partway along the shaft portions 14a and 14b.

In this manner, the movable mirror portion 11 is made to swing around the Y-axis and the frame body portion 13 is made to swing around the X-axis, and thus the movable mirror portion 11 (in other words, the light reflection plate 113) is made to swing (rotate) around two axes of the X-axis and the Y-axis which are perpendicular to each other.

As described above, the base portion 111, the shaft portions 12a and 12b, the frame body portion 13, the shaft portions 14a and 14b, and the fixing portion 15 are integrally formed.

In this embodiment, the base portion 111, the shaft portions 12a and 12b, the frame body portion 13, the shaft portions 14a and 14b, and the fixing portion 15 are formed by etching an SOI substrate in which a first Si layer (device layer), a $SiO_2$ layer (box layer), and a second Si layer (handle layer) are laminated in this order. According to this, the first vibration system and the second vibration system can have excellent vibration characteristics. In addition, the SOI substrate can be finely processed by the etching, and thus when the base portion 111, the shaft portions 12a and 12b, the frame body portion 13, the shaft portions 14a and 14b, and the fixing portion 15 are formed using the SOI substrate, these members can have excellent dimensional accuracy, and thus miniaturization of the optical scanner 1 can be realized.

In addition, the base portion 111, the shaft portions 12a and 12b, and the shaft portions 14a and 14b are constituted by the first Si layer of the SOI substrate, respectively. According to this, the shaft portions 12a and 12b, and the shaft portions 14a and 14b can have excellent elasticity. In addition, it is possible to suppress contact of the base portion 111 with the frame body portion 13 during rotation around the Y-axis.

Here, the first Si layer of the SOI substrate is a p-type silicon single-crystal substrate or an n-type silicon single-crystal substrate. In addition, for example, in a case where the first Si layer is a p-type silicon single-crystal substrate of (100) plane, the shaft portions 14a and 14b extend along a <110> direction of a crystal axis of the p-type silicon single-crystal substrate of the (100) plane, respectively. In addition, in a case where the first Si layer is the n-type silicon single-crystal substrate of the (100) plane, the shaft portions 14a and 14b extend along a <100> direction of a crystal axis of the n-type silicon single-crystal substrate of the (100) plane, respectively.

In addition, the frame body portion 13 and the fixing portion 15 are constituted by a laminated body of the first Si layer, the $SiO_2$ layer, and the second Si layer of the SOI substrate. According to this, the frame body portion 13 and the fixing portion 15 can have excellent rigidity.

In addition, the $SiO_2$ layer and the second Si layer of the frame body portion 13, that is, a portion of the frame body portion 13 which further protrudes in a thickness direction in comparison to the shaft portions 12a and 12b or the shaft portions 14a and 14b constitutes the above-described rib 131 which enhances the rigidity of the frame body portion 13.

In addition, it is preferable that a reflection prevention treatment is carried out with respect to an upper surface of a portion (the fixing portion 15 in this embodiment) located on an outer side of the light reflection plate 113 in a plan view. According to this, it is possible to suppress unnecessary light that is emitted to a portion other than the light reflection plate 113 and thus becomes stray light.

Although not particularly limited, as the reflection prevention treatment, for example, formation of reflection prevention film (dielectric multi-layered film), a roughening treatment, a blacking treatment, and the like may be exemplified.

In addition, a constituent material and a forming method of the above-described base portion 111, the shaft portions 12a and 12b, the frame body portion 13, the shaft portions 14a and 14b, and the fixing portion 15 are illustrative only, and the invention is not limited thereto. For example, the base portion 111, the shaft portions 12a and 12b, the frame body portion 13, the shaft portions 14a and 14b, and the fixing portion 15 may be formed by etching the silicon substrate.

In addition, in this embodiment, the spacer 112 and the light reflection plate 113 are also formed by etching the SOI substrate. In addition, the spacer 112 is constituted by a laminated body of the $SiO_2$ layer and the second Si layer of the SOI substrate. In addition, the light reflection plate 113 is constituted by the first Si layer of the SOI substrate.

As described above, since the spacer 112 and the light reflection plate 113 are formed using the SOI substrate, it is possible to simplify the manufacturing process for the spacer 112 and the light reflection plate 113, which are bonded to each other, with high accuracy.

For example, the spacer 112 is bonded to the base portion 111 by a bonding material (not shown) such as an adhesive, and a brazing material.

The fixing portion 15 is not limited to the above-described configuration as long as the fixing portion 15 is configured to support the frame body portion 13. For example, the fixing portion 15 and the shaft portions 14a and 14b may be formed separately.

The permanent magnet 21 is bonded onto the lower surface of the frame body portion 13 (surface opposite to the light reflection plate 113), that is, a leading end surface of the rib 131.

Although not particularly limited, as a method of bonding the permanent magnet 21 and the frame body portion 13, for example, a bonding method using an adhesive may be used.

The permanent magnet 21 is magnetized in a direction inclined with respect to the X-axis and the Y-axis in a plan view.

In this embodiment, the permanent magnet 21 has a rectangular shape (rod shape) which extends in a direction inclined with respect to the X-axis and the Y-axis. In addition, the permanent magnet 21 is magnetized in a longitudinal direction thereof. That is, the permanent magnet 21 is magnetized in such a manner that one end thereof is set as an S pole and the other end is set as an N pole.

In addition, the permanent magnet 21 is provided symmetrically with respect to an intersection between the X-axis and the Y-axis as a center in a plan view.

In addition, in this embodiment, the description is made with respect to a case where one permanent magnet is provided to the frame body portion 13 as an example, but there is no limitation thereto. For example, two permanent magnets may be provided to the frame body portion 13. In this case, for example, two long permanent magnets may be provided to the frame body portion 13 in such a manner that the permanent magnets face each other through the base portion 111 and are parallel with each other in a plan view.

Although not particularly limited, but it is preferable that an inclination angle θ of a magnetization direction (extending direction) of the permanent magnet 21 with respect to the X-axis is 30° to 60°, more preferably 30° to 45, and still more preferably 45°. When the permanent magnet 21 is provided as described above, it is possible to make the movable mirror portion 11 rotate around the X-axis in a smooth and reliable manner.

In contrast, when the inclination angle θ is less than the lower limit, the movable mirror portion 11 may not sufficiently rotate around the X-axis depending on manufacturing conditions such as intensity of a voltage which is applied to the coil 31 by the voltage application unit 4. On the other hand, when the inclination angle θ exceeds the upper limit, the movable mirror portion 11 may not sufficiently rotate around the Y-axis depending on the manufacturing conditions.

As the permanent magnet 21, for example, a neodymium magnet, a ferrite magnet, a samarium cobalt magnet, an alnico magnet, a bond magnet, and the like may be appropriately used. The permanent magnet 21 is obtained by magnetizing a high magnetic substance. For example, the permanent magnet 21 is formed by providing a hard magnetic substance before magnetization to the frame body portion 13 and then magnetizing the hard magnetic substance. This is because when providing the permanent magnet 21 that is already magnetized to the frame body portion 13, it may be difficult to provide the permanent magnet 21 at a desired position due to an effect of magnetic fields of the outside or other components.

The coil 31 is provided immediately below the permanent magnet 21. That is, the coil 31 is provided to face a lower surface of the frame body portion 13. According to this, it is possible to make a magnetic field generated from the coil 31 effectively act on the permanent magnet 21. According to this, power saving and miniaturization of the optical scanner 1 can be realized.

In this embodiment, the coil 31 is wound around the magnetic core 32. According to this, it is possible to make a magnetic field generated from the coil 31 effectively act on the permanent magnet 21. In addition, the magnetic core 32 may be omitted.

The coil 31 is electrically connected to the voltage application unit 4.

In addition, when a voltage is applied to the coil 31 by the voltage application unit 4, magnetic fields in directions perpendicular to the X-axis and the Y-axis are generated from the coil 31.

As shown in FIG. 4, the voltage application unit 4 includes a first voltage generation unit 41 which generates a first voltage $V_1$ for making the movable mirror portion 11 rotate around the Y-axis, a second voltage generation unit 42 which generates a second voltage $V_2$ for making the movable mirror portion 11 rotate around the X-axis, and a voltage superimposition unit 43 which superimposes the first voltage $V_1$ and the second voltage $V_2$. A voltage which is superimposed by the voltage superimposition unit 43 is applied to the coil 31.

As shown in FIG. 5A, the first voltage generation unit 41 generates the first voltage $V_1$ (voltage for horizontal scanning) that periodically varies at a period $T_1$. That is, the first voltage generation unit 41 generates the first voltage $V_1$ of a first frequency ($1/T_1$).

The first voltage $V_1$ has a waveform such as a sinusoidal wave. Accordingly, the optical scanner 1 can effectively carry out main scanning with light. In addition, the waveform of the first voltage $V_1$ is not limited to this.

In addition, the first frequency ($1/T_1$) is not particularly limited as long as the first frequency is a frequency suitable for horizontal scanning, but 10 kHz to 40 kHz is preferable.

In this embodiment, the first frequency is set to be equal to a torsional resonance frequency (f1) of a first vibration system (torsional vibration system) constituted by the movable mirror portion 11, and the pair of shaft portions 12a and 12b. That is, the first vibration system is made (manufactured) in such a manner that the torsional resonance frequency f1 becomes a frequency suitable for horizontal scanning. According to this, it is possible to enlarge a rotation angle of the movable mirror portion 11 around the Y-axis.

On the other hand, as shown in FIG. 5B, the second voltage generation unit 42 generates a second voltage $V_2$ (voltage for vertical scanning) which periodically varies at a period $T_2$ different from the period $T_1$. That is, the second voltage generation unit 42 generates the second voltage $V_2$ of a second frequency ($1/T_2$).

The second voltage $V_2$ has a waveform such as a sawtooth wave. Accordingly, the optical scanner 1 can effectively carry out vertical scanning (sub-scanning) with light. In addition, the waveform of the second voltage $V_2$ is not limited to the aforementioned waveform.

The second frequency ($1/T_2$) is different from the first frequency ($1/T_1$) and is not particularly limited as long as the second frequency is a frequency suitable for vertical scanning, but 30 Hz to 120 Hz (approximately 60 Hz) is preferable. As described above, when the frequency of the second voltage $V_2$ is set to approximately 60 Hz, and the frequency of the first voltage $V_1$ is set to 10 kHz to 40 kHz as described above, it is possible to make the movable mirror portion 11 rotate around each of two axes (X-axis and Y-axis) perpendicular to each other at a frequency suitable for drawing in a display. However, a combination of the frequency of the first voltage $V_1$ and the frequency of the second voltage $V_2$ is not particularly limited as long as the movable mirror portion 11 can rotate around each of the X-axis and the Y-axis.

In this embodiment, the frequency of the second voltage $V_2$ is adjusted to be a frequency different from a torsional resonance frequency (resonance frequency) of a second vibration system (torsional vibration system) constituted by the movable mirror portion 11, the pair of shaft portions 12a and 12b, the frame body portion 13, the pair of shaft portions 14a and 14b, and the permanent magnet 21.

It is preferable that the frequency (second frequency) of the second voltage $V_2$ is smaller than the frequency (first frequency) of the first voltage $V_1$. That is, it is preferable that the period $T_2$ is longer than the period $T_1$. According to this, it is possible to make the movable mirror portion 11 rotate around the X-axis at the second frequency while making the movable mirror portion 11 rotate around the Y-axis at the first frequency in a more reliable and smooth manner.

In addition, when the torsional resonance frequency of the first vibration system is set to f1 [Hz], and the torsional resonance frequency of the second vibration system is set to f2 [Hz], it is preferable that f1 and f2 satisfy a relationship of f2<f1, and more preferably a relationship of f1≥10f2. According to this, it is possible to make the movable mirror portion 11 rotate around the X-axis at the frequency of the second voltage $V_2$ while making the movable mirror portion 11 rotate around the Y-axis at the frequency of the first voltage $V_1$ in a smoother manner. In contrast, when f1≥f2 is satisfied, vibration of the first vibration system according to the second frequency may occur.

The first voltage generation unit 41 and the second voltage generation unit 42 are connected to the control unit 6, respectively, and are driven based on signals transmitted from the control unit 6. The voltage superimposition unit 43 is connected to the first voltage generation unit 41 and the second voltage generation unit 42.

The voltage superimposition unit 43 includes an adder 43a which is configured to apply a voltage to the coil 31. The adder 43a receives the first voltage $V_1$ from the first voltage generation unit 41 and the second voltage $V_2$ from the second voltage generation unit 42, and superimposes these voltages to apply the resultant superimposed voltage to the coil 31.

Next, a method of driving the optical scanner 1 will be described. In addition, in this embodiment, as described above, the frequency of the first voltage $V_1$ is set to be equal to the torsional resonance frequency of the first vibration system. The frequency of the second voltage $V_2$ is set to a value which is different from the torsional resonance frequency of the second vibration system and which is smaller than the frequency of the first voltage $V_1$ (for example, the frequency of the first voltage $V_1$ is set to 18 kHz, and the frequency of the second voltage $V_2$ is set to 60 Hz).

For example, the first voltage $V_1$ as shown in FIG. 5A and the second voltage $V_2$ as shown in FIG. 5B are superimposed in the voltage superimposition unit 43 and the resultant superimposed voltage is applied to the coil 31.

In this case, due to the first voltage $V_1$, a magnetic field which attracts one magnetic pole 211 of the permanent magnet 21 toward the coil 31 and which separates the other magnetic pole 212 of the permanent magnet 21 from the coil 31 (this magnetic field is referred to as a "magnetic field A1"), and a magnetic field which separates the one magnetic pole 211 of the permanent magnet 21 from the coil 31 and attracts the other magnetic pole 212 of the permanent magnet 21 toward the coil 31 (this magnetic field is referred to as a "magnetic field A2") are alternately switched.

Here, as described above, in the plan view of FIG. 1, the N pole of the permanent magnet 21 is located on one side and the S pole of the permanent magnet 21 is located on the other side with the Y-axis interposed therebetween. Accordingly, the magnetic field A1 and the magnetic field A2 are alternately switched, and thus vibration having a torsional vibration component around the Y-axis is excited to the frame body portion 13. As a result, along with the vibration, the movable mirror portion 11 rotates around the Y-axis at the frequency of the first voltage $V_1$ while torsionally deforming the shaft portions 12a and 12b.

In addition, the frequency of the first voltage $V_1$ is equal to the torsional resonance frequency of the first vibration system. Accordingly, it is possible to make the movable mirror portion 11 effectively rotate around the Y-axis by the first voltage $V_1$. That is, even when the vibration of the frame body portion 13, which has the torsional vibration component around the Y-axis, is small, it is possible to enlarge the rotation angle of the movable mirror portion 11 around the Y-axis which accompanies the vibration.

On the other hand, due to the second voltage $V_2$, a magnetic field which attracts one magnetic pole 211 of the permanent magnet 21 toward the coil 31 and which separates the other magnetic pole 212 of the permanent magnet 21 from the coil 31 (this magnetic field is referred to as a "magnetic field B1"), and a magnetic field which separates the one magnetic pole 211 of the permanent magnet 21 from the coil 31 and which attracts the other magnetic pole 212 of the permanent magnet 21 toward the coil 31 (this magnetic field is referred to as a "magnetic field B2") are alternately switched.

Here, as described above, in the plan view of FIG. 1, the N pole of the permanent magnet 21 is located on one side and the S pole of the permanent magnet 21 is located on the other side with the X-axis interposed therebetween. Accordingly, the magnetic field B1 and the magnetic field B2 are alternately switched, and thus the frame body portion 13 rotates around the X-axis at the frequency of the second voltage $V_2$ together with the movable mirror portion 11 while torsionally deforming the shaft portions 14a and 14b.

In addition, the frequency of the second voltage $V_2$ is set to be greatly lower than the frequency of the first voltage $V_1$. In addition, the torsional resonance frequency of the second vibration system is made to be lower than the torsional resonance frequency of the first vibration system. Accordingly, it is possible to suppress rotation of the movable mirror portion 11 around the Y-axis at the frequency of the second voltage $V_2$.

As described above, when the voltage obtained by superimposing the first voltage $V_1$ and the second voltage $V_2$ is applied to the coil 31, it is possible to make the movable mirror portion 11 rotate around the X-axis at the frequency of the second voltage $V_2$ while making the movable mirror portion 11 rotate around the Y-axis at the frequency of the first voltage $V_1$. According to this, it is possible to realize reduction in the manufacturing cost and miniaturization of a device, and it is possible to make the movable mirror portion 11 rotate around each of the X-axis and the Y-axis by an electromagnetic driving method (moving magnet method), respectively. It is possible to reduce the number of components (permanent magnets and coils) which constitute a drive source, and thus a simple and compact configuration can be realized. In addition, the coil 31 is spaced away from the vibration system of the optical scanner 1, and thus it is possible to suppress an adverse effect on the vibration system due to heat generation at the coil 31.

The movement of the movable mirror portion 11 is detected based on a detection signal of the strain detection elements 51 and 52.

Hereinafter, the strain detection elements 51 and 52 will be described in detail.

Figure 6:
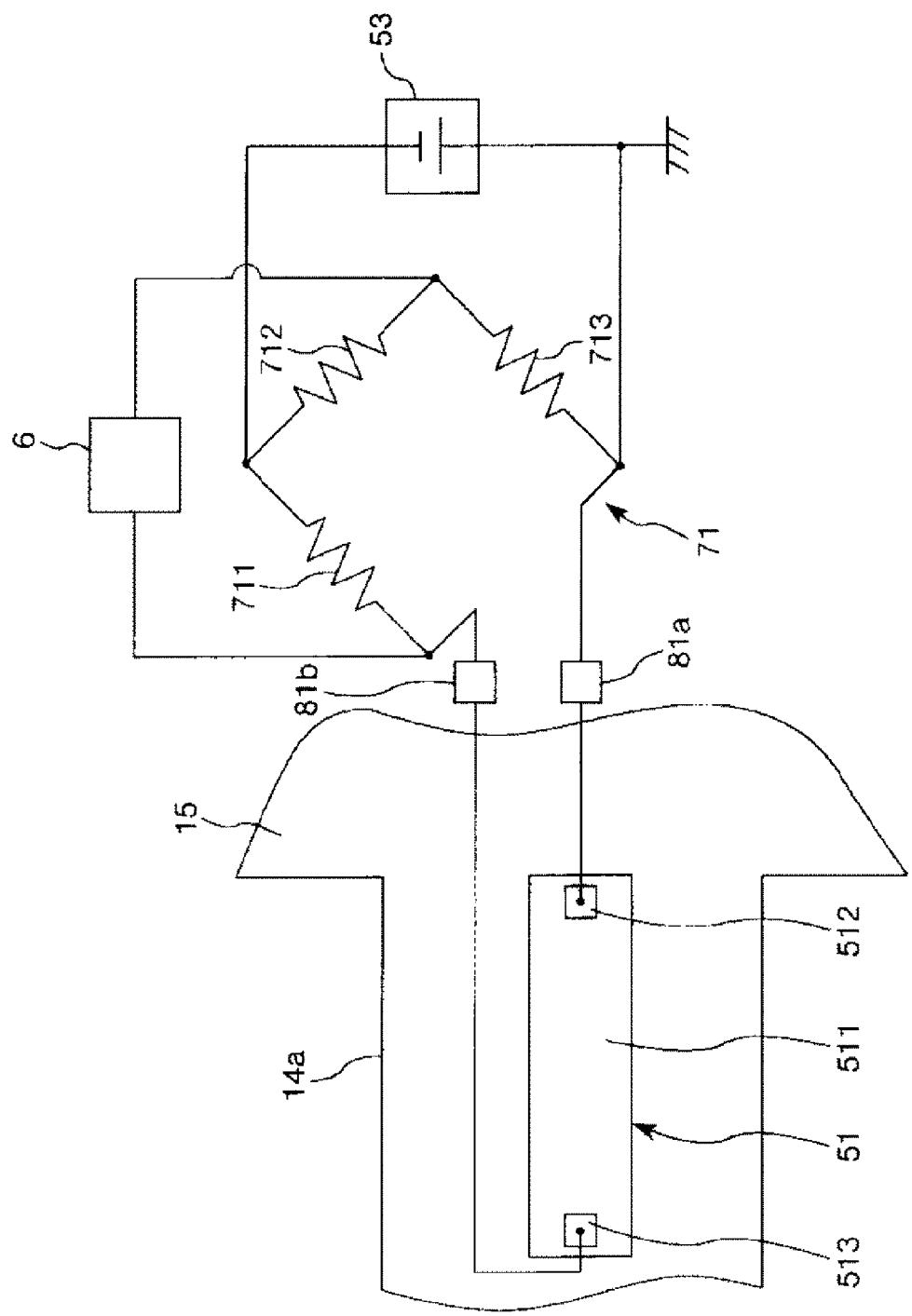
FIG. 6 is a view illustrating a first strain detection element of the optical scanner shown in FIG. 1.
Figure 7:
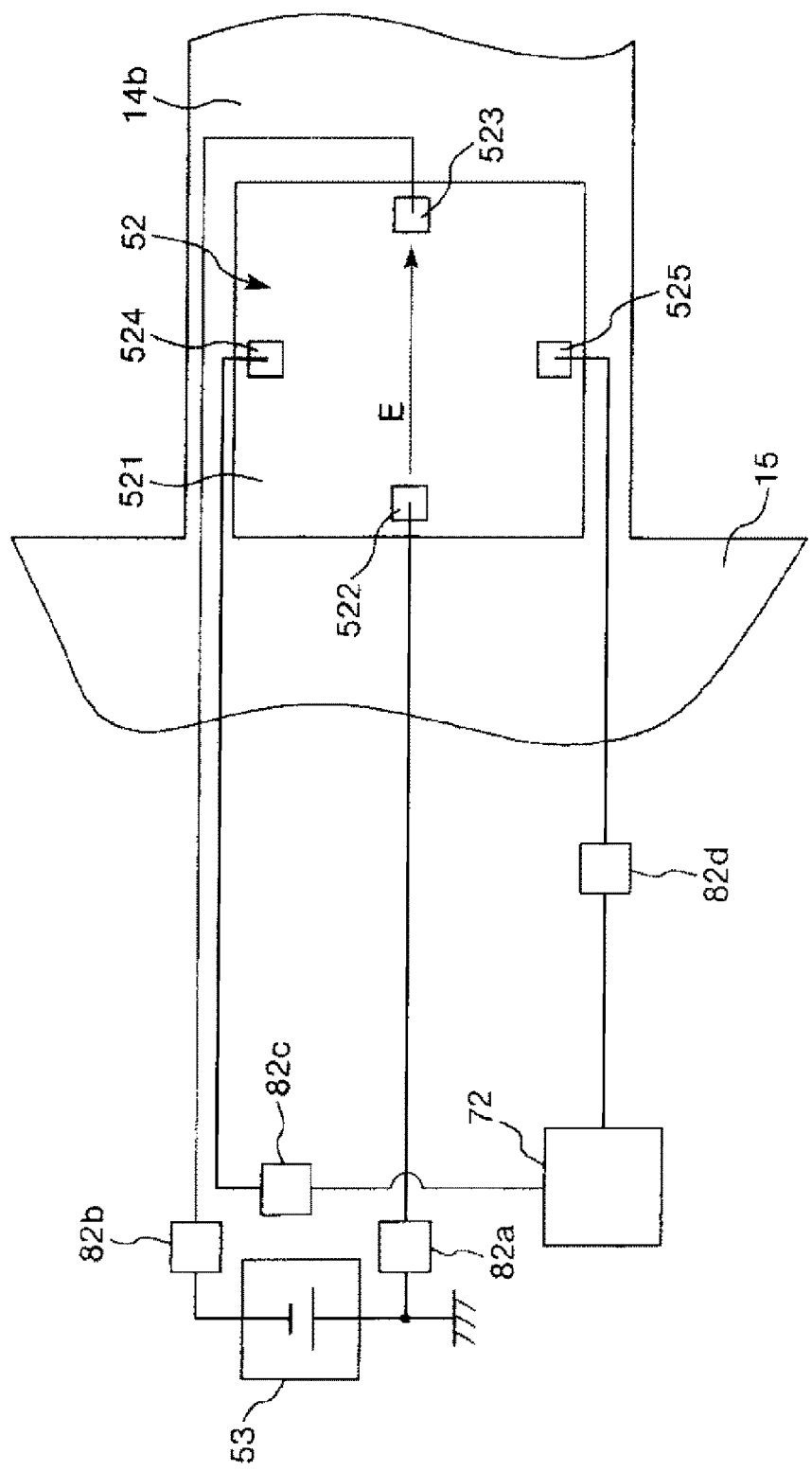
FIG. 7 is a view illustrating a second strain detection element of the optical scanner shown in FIG. 1.

FIG. 6 is a view illustrating a first strain detection element of the optical scanner shown in FIG. 1. FIG. 7 is a view illustrating a second strain detection element of the optical scanner shown in FIG. 1.

The strain detection element 51 (first strain detection element) is disposed at the shaft portion 14a and detects deformation (mainly, bending deformation) of the shaft portion 14a.

In this embodiment, the strain detection element 51 is disposed at an end of the shaft portion 14a on a fixing portion 15 side. According to this, when drawing an interconnection, which is connected to the strain detection element 51, to the fixing portion 15, it is possible to reduce a portion of the interconnection which is disposed at the shaft portion 14a.

The strain detection element 51 is a two-terminal type piezoresistive element.

Specifically, as shown in FIG. 6, the strain detection element 51 includes a piezoresistive region 511 and a pair of terminals 512 and 513 which is disposed on the piezoresistive region 511.

The piezoresistive region 511 is formed by doping a surface of the shaft portion 14a with impurities. More specifically, in a case where the shaft portion 14a is formed by processing a p-type silicon single-crystal substrate, the piezoresistive region 511 is an n-type silicon single crystal (n-type resistive region) which is formed by doping the surface of the shaft portion 14a with impurities such as phosphorus. On the other hand, in a case where the shaft portion 14a is formed by processing an n-type silicon single-crystal substrate, the piezoresistive region 511 is a p-type silicon single crystal (p-type resistive region) which is formed by doping the surface of the shaft portion 14a with impurities such as boron.

In addition, the piezoresistive region 511 has a rectangular shape which extends in a direction (that is, the X-axis direction) along a longitudinal direction of the shaft portion 14a. In addition, in a plan view, the piezoresistive region 511 is disposed at the central portion of the shaft portion 14a in a width direction thereof.

In addition, in this embodiment, the entirety of the piezoresistive region 511 is provided on the shaft portion 14a. However, for example, the piezoresistive region 511 may be provided across the boundary between the shaft portion 14a and the fixing portion 15 without limitation to the position which is shown in the drawing as long as the piezoresistive region 511 can receive a tensile stress or a compressive stress due to bending deformation of the shaft portion 14a.

The pair of terminals 512 and 513, which are lined up in a direction along the longitudinal direction (that is, the X-axis direction) of the shaft portion 14a, are disposed on the piezoresistive region 511.

In this embodiment, the pair of terminals 512 and 513 is disposed at both ends of the piezoresistive region 511 in the longitudinal direction thereof.

The pair of terminals 512 and 513 is electrically connected to the first signal processing circuit 71.

In the strain detection element 51, when a tensile stress or a compressive stress occurs in the piezoresistive region 511 along with the bending deformation of the shaft portion 14a, a specific resistance value of the piezoresistive region 511 varies in correspondence with the degree of the tensile stress or the compressive stress.

In this embodiment, the piezoresistive region 511 has a rectangular shape extending in the X-axis direction, and the pair of terminals 512 and 513 is disposed on the piezoresistive region 511 in a line in the X-axis direction. Accordingly, it is possible to intensify a signal which is included in a signal output from the strain detection element 51 and which is based on the bending deformation of the shaft portion 14a.

Here, the piezoresistive region 511 and the pair of terminals 512 and 513 are disposed symmetrically with respect to the X-axis in a plan view. Therefore, the strain detection element 51 can detect only a tensile stress or a compressive stress which accompanies the bending deformation of the shaft portion 14a. That is, it is possible to make the strain detection element 51 not detect shearing accompanying torsional deformation of the shaft portion 14a. Accordingly, it is possible to suppress or prevent a signal based on the torsional deformation of the shaft portion 14a from being included in a signal output from the strain detection element 51. As a result, it is possible to accurately detect movement of the movable mirror portion 11 around the Y-axis with a relatively simple configuration by using a signal output from the strain detection element 51.

The detection signal of the strain detection element 51 is input to the first signal processing circuit 71 (first signal processing unit) through a pair of terminals 81a and 81b which is provided to the fixing portion 15.

The first signal processing circuit 71 has a function of converting the detection signal of the strain detection element 51 to a signal appropriate for signal processing by a predetermined process.

Examples of a specific process in the first signal processing circuit 71 include impedance conversion, temperature compensation, signal amplification, filtration, AD conversion, and the like.

As described above, the detection signal of the strain detection element 51 includes a signal based on the bending deformation of the shaft portion 14a. In addition, the first signal processing circuit 71 carries out the above-described process, and outputs a signal based on the bending deformation of the shaft portion 14a. According to this, it is possible to detect movement of the movable mirror portion 11 around the Y-axis based on the signal output from the first signal processing circuit 71.

In this embodiment, as shown in FIG. 6, the first signal processing circuit 71 includes resistive elements 711, 712, and 713.

The resistive elements 711, 712, and 713, and the strain detection element 51 constitute a bridge circuit (Wheatstone bridge circuit). This bridge circuit is supplied with electric power by a strain detection element drive circuit 53, and outputs a signal (voltage) which corresponds to variation of resistance values of the strain detection element 51 to the control unit 6.

It is preferable that each of the resistive elements 711, 712, and 713 has substantially the same temperature characteristics as the strain detection element 51. According to this, it is possible to stably output a signal (voltage) which corresponds to an amount of bending deformation of the shaft portion 14a regardless of the temperature characteristics of the strain detection element 51.

In addition, the resistive elements 711, 712, and 713 may be disposed at the fixing portion 15 at a position which is not susceptible to a stress accompanying deformation of the shaft portions 14a and 14b. In this case, each of the resistive elements 711, 712, and 713 may be constituted by a resistive region configured in the same manner as the piezoresistive region of the strain detection element 51, and a pair of terminals provided at the resistive region. In addition, it is preferable that each of the resistive elements 711, 712, and 713 is disposed at a position under the same temperature condition as the strain detection element 51.

A signal output from the first signal processing circuit 71 is input to the control unit 6 shown in FIG. 3.

On the other hand, the strain detection element 52 is disposed at the shaft portion 14b and detects deformation (mainly, torsional deformation) of the shaft portion 14b.

In this embodiment, the strain detection element 52 is disposed at an end of the shaft portion 14b on a fixing portion 15 side. According to this, when drawing an interconnection, which is connected to the strain detection element 52, to the fixing portion 15, it is possible to reduce a portion of the interconnection which is disposed at the shaft portion 14b.

The strain detection element 52 is a four-terminal type piezoresistive element.

Specifically, as shown in FIG. 7, the strain detection element 52 includes a piezoresistive region 521, and a pair of input terminals 522 and 523 and a pair of output terminals 524 and 525 which are disposed on the piezoresistive region 521.

The piezoresistive region 521 is formed by doping a surface of the shaft portion 14b with impurities. More specifically, in a case where the shaft portion 14b is formed by processing a p-type silicon single-crystal substrate, the piezoresistive region 521 is an n-type silicon single crystal (n-type resistive region) which is formed by doping the surface of the shaft portion 14b with impurities such as phosphorus. On the other hand, in a case where the shaft portion 14b is formed by processing an n-type silicon single-crystal substrate, the piezoresistive region 521 is a p-type silicon single crystal (p-type resistive region) which is formed by doping the surface of the shaft portion 14b with impurities such as boron.

In this embodiment, the piezoresistive region 521 has a rectangular shape having a pair of sides along the X-axis direction and a pair of sides along the Y-axis direction in a plan view.

In addition, in this embodiment, the entirety of the piezoresistive region 521 is provided on the shaft portion 14b. However, for example, the piezoresistive region 521 may be provided across the boundary between the shaft portion 14b and the fixing portion 15 without limitation to the position which is shown in the drawing as long as the piezoresistive region 521 can receive a shear stress due to torsional deformation of the shaft portion 14b.

The pair of input terminals 522 and 523, which is lined up in a direction along the longitudinal direction (that is, the X-axis direction) of the shaft portion 14b, is disposed on the piezoresistive region 521, and the pair of output terminals 524 and 525, which is lined up in a direction along a direction (that is, the Y-axis direction) perpendicular to the longitudinal direction of the shaft portion 14b, is disposed.

In this embodiment, the pair of input terminals 522 and 523 is disposed at both ends of the piezoresistive region 521 in the X-axis direction, and the pair of output terminals 524 and 525 is disposed at both ends of the piezoresistive region 521 in the Y-axis direction.

The pair of input terminals 522 and 523 is electrically connected to the strain detection element drive circuit 53 through a pair of terminals 82a and 82b which is provided at the fixing portion 15.

On the other hand, the pair of output terminals 524 and 525 is electrically connected to the second signal processing circuit 72 through a pair of terminals 82c and 82d which is provided at the fixing portion 15.

In the strain detection element 52, the strain detection element drive circuit 53 applies a voltage between the pair of input terminals 522 and 523 with a constant voltage or a constant current. According to this, an electric field E occurs over the piezoresistive region 521. When a shear stress occurs in the piezoresistive region 521 along with torsional deformation of the shaft portion 14b under the electric field E, a specific resistance value of the piezoresistive region 521 varies in correspondence with the degree of the shear stress, and thus a potential difference between the pair of output terminals 524 and 525 varies. The potential difference varies in correspondence with an amount of torsional deformation of the shaft portion 14b or a swing angle of the movable mirror portion 11 and the frame body portion 13 around the X-axis. Accordingly, movement of the movable mirror portion 11 around the X-axis can be detected based on the potential difference.

In addition, the strain detection element 52 can detect only the shear stress which accompanies the torsional deformation of the shaft portion 14b. That is, it is possible to make the strain detection element 52 not detect a tensile stress or a compressive stress which accompanies the bending deformation of the shaft portion 14b. Accordingly, it is possible to suppress or prevent a signal based on the bending deformation of the shaft portion 14b from being included in a signal output from the strain detection element 52. As a result, it is possible to accurately detect movement of the movable mirror portion 11 around the X-axis with a relatively simple configuration by using a signal output from the strain detection element 52.

The detection signal of the strain detection element 52 is input to the second signal processing circuit 72 (second signal processing unit).

The second signal processing circuit 72 has a function of converting the detection signal of the strain detection element 52 to a signal appropriate for signal processing by a predetermined process.

Examples of a specific process in the second signal processing circuit 72 include impedance conversion, temperature compensation, signal amplification, filtration, AD conversion, and the like.

As described above, the detection signal of the strain detection element 52 includes a signal based on the torsional deformation of the shaft portion 14b. In addition, the second signal processing circuit 72 carries out the above-described process, and outputs a signal based on the torsional deformation of the shaft portion 14b. According to this, it is possible to detect movement of the movable mirror portion 11 around the X-axis based on the signal output from the second signal processing circuit 72.

The signal output from the second signal processing circuit 72 is input to the control unit 6 shown in FIG. 3.

In the control unit 6, movement of the movable mirror portion 11 around the Y-axis is detected based on the signal output from the first signal processing circuit 71. According to this, it is possible to control the movement of the movable mirror portion 11 around the Y-axis based on the movement which is detected in order for the movement to enter a desired state, or it is possible to synchronize the movement of the movable mirror portion 11 around the Y-axis and the operation of other devices.

In the control unit 6, movement of the movable mirror portion 11 around the X-axis is detected based on the signal output from the second signal processing circuit 72. Accordingly to this, it is possible to control the movement of the movable mirror portion 11 around the X-axis based on the movement which is detected in order for the movement to enter a desired state, or it is possible to synchronize the movement of the movable mirror portion 11 around the X-axis and the operation of other devices.

In this embodiment, as shown in FIG. 3, the control unit 6 includes an H detection unit 61, a V detection unit 62, an H control unit 63, a V control unit 64, an H target value storage unit 65, and a V target value generation unit 66.

The H detection unit 61 generates, for example, a signal corresponding to the swing angle of the movable mirror portion 11 around the Y-axis based on the signal output from the first signal processing circuit 71 as a signal for control of horizontal scanning. In addition, a method of detecting the swing angle of the movable mirror portion 11 around the Y-axis will be described later in detail.

As a signal for control of vertical scanning, the V detection unit 62 generates, for example, a signal corresponding to the swing angle of the movable mirror portion 11 around the X-axis based on the signal output from the second signal processing circuit 72.

The H control unit 63 generates a drive signal for horizontal scanning based on an H target value which is stored in the H target value storage unit 65 in advance and a signal output from the H detection unit 61.

In the H target value storage unit 65, for example, a phase difference with a drive signal for horizontal scanning, and the maximum swing angle of the movable mirror portion 11 around the Y-axis are stored as the H target value.

The V control unit 64 generates a drive signal for vertical scanning based on a V target value output from the V target value generation unit 66 and a signal output from the V detection unit 62.

As a V target value, the V target value generation unit 66 generates, for example, a swing angle of the movable mirror portion 11 around the X-axis based on line information in a vertical scanning direction which is input from the outside.

Here, with regard to a method of detecting movement of the movable mirror portion 11 around the Y-axis by using a detection signal of the strain detection element 51, the description will be made with respect to a case of detecting a swing angle of the movable mirror portion 11 around the Y-axis as an example.

First Detection Method

In a first detection method, the movement (in this example, the swing angle) of the movable mirror portion 11 around the Y-axis is estimated based on a signal output from the first signal processing circuit 71 by using an observer.

Hereinafter, the first detection method will be described in detail.

As described above, the optical scanner 1 superimposes a first voltage for horizontal scanning and a second voltage for vertical scanning and applies the resultant superimposed voltage to the coil 31 to make the movable mirror portion 11 swing around the Y-axis (first axis) at a frequency of the first voltage and swing around the X-axis (second axis) at a frequency of the second voltage.

Here, the frequency (drive frequency of horizontal scanning) of the first voltage and the frequency (drive frequency of vertical scanning) of the second voltage are sufficiently apart away from each other, and thus it is not necessary to consider cross-talk between torque generated by the first voltage and torque generated by the second voltage. Accordingly, it can be considered that movement around the X-axis and movement around the Y-axis in the optical scanner 1 occur independently.

In this case, an equation of motion of the optical scanner 1 around the Y-axis can be expressed by the following Expression (1).

$$\begin{cases} I_{hh}\ddot{\theta}_{hh} + c_{hh}(\dot{\theta}_{hh} - \dot{\theta}_{vh}) + k_{hh}(\theta_{hh} - \theta_{vh}) = 0 \\ I_{vh}\ddot{\theta}_{vh} + c_{vh}\dot{\theta}_{vh} - c_{hh}(\dot{\theta}_{hh} - \dot{\theta}_{vh}) + k_{vh}\theta_{vh} - k_{hh}(\theta_{hh} - \theta_{vh}) = T(t) \end{cases} \quad (1)$$

Here, in Expression (1), $\theta_{hh}$: a swing angle of the movable mirror portion 11 around the Y-axis, $\theta_{vh}$: a swing angle of the frame body portion 13 around the Y-axis, $I_{hh}$: inertia of the movable mirror portion 11 around the Y-axis, $I_{vh}$: inertia of frame body portion 13 around the Y-axis, $C_{hh}$: an attenuation coefficient of swing (vibration) of the movable mirror portion 11 around the Y-axis, $C_{vh}$: an attenuation coefficient of swing (vibration) of the frame body portion 13 around the Y-axis, $k_{hh}$: a torsional spring constant of the shaft portions 12a and 12b around the Y-axis, $k_{vh}$: a torsional spring constant of the shaft portions 14a and 14b around the Y-axis, and T(t): torque around the Y-axis which the frame body portion 13 receives due to an interaction between magnetic fields of the permanent magnet 21 and the coil 31.

$$X = \begin{bmatrix} \theta_{hh} \\ \theta_{vh} \\ \dot{\theta}_{hh} \\ \dot{\theta}_{vh} \end{bmatrix}$$

When X is set like Formula 2, an output of a detection signal of the strain detection element 51 which relates to a bending stress of the shaft portion 14a is set as y, and a conversion coefficient of the strain detection element 51 is set as α, the following relationship between X and y can be derived from Expression (1).

$$\dot{X} = AX + BU$$

$$y = CX$$

$$A = \begin{bmatrix} 0 & 0 & 1 & 0 \\ 0 & 0 & 0 & 1 \\ \dfrac{-k_{hh}}{I_{hh}} & \dfrac{k_{vh}}{I_{hh}} & \dfrac{-c_{hh}}{I_{hh}} & \dfrac{c_{vh}}{I_{hh}} \\ \dfrac{k_{hh}}{I_{vh}} & \dfrac{-k_{vh}}{I_{vh}} & \dfrac{c_{hh}}{I_{vh}} & \dfrac{-c_{vh}}{I_{vh}} \end{bmatrix},$$

$$B = \begin{bmatrix} 0 \\ 0 \\ 0 \\ \dfrac{1}{I_{vh}} \end{bmatrix},$$

$$C = \begin{bmatrix} 0 & \alpha & 0 & 0 \end{bmatrix}$$

When an observable coefficient of a system which is given from the relationship between X and y is set like Formula 4, $$M_{obs} = \begin{bmatrix} C_1 \\ C_1 A_1 \\ C_1 A_1^1 \\ C_1 A_1^3 \end{bmatrix}$$

the following Expression can be obtained.

$$M_{obs} = \begin{bmatrix} 0 & 1 & 0 & 0 \\ 0 & 0 & 0 & 1 \\ \dfrac{k_{11}}{I_{21}} & -\dfrac{k_{21}}{I_{21}} & \dfrac{c_{21}}{I_{21}} & -\dfrac{c_{21}}{I_{21}} \\ \dfrac{c_{11}k_{11}}{I_{11}I_{21}} - \dfrac{c_{21}k_{11}}{I_{21}^2} & \dfrac{c_{11}k_{21}}{I_{11}I_{21}} + \dfrac{c_{21}k_{21}}{I_{21}^2} & -\dfrac{c_{11}^2}{I_{11}I_{21}} + \dfrac{k_{11}}{I_{21}} - \dfrac{c_{11}c_{21}}{I_{21}^2} & \dfrac{c_{11}c_{21}}{I_{11}I_{21}} - \dfrac{k_{21}}{I_{21}} + \dfrac{c_{21}^2}{I_{21}^2} \end{bmatrix}$$

Here, $M_{obs}$ is 4, and thus the system is observable. Accordingly, it is possible to estimate the swing angle (deviation angle) of the movable mirror portion 11 around the Y-axis by an observer based on a signal which is based on the bending deformation of the shaft portion 14a and which is included in the detection single of the strain detection element 51 which is disposed at the shaft portion 14a.

With regard to the observer, an observer gain is set as L, and relationships of estimated values of X and y are expressed as follows.

$$\hat{\dot{X}} = A\hat{X} + BU - L(\hat{y} - y)$$

$$\hat{y} = C\hat{X}$$

(here, $\hat{X}$=(an estimated value of X), $\hat{y}$=(an estimated value of y))

When using the relationships of the estimated values of X and y, it is possible to estimate the swing angle of the movable mirror portion 11 around the Y-axis based on a signal which is included in the detection signal of the strain detection element 51 and which is based on the bending deformation of the shaft portion 14a.

According to the above-described first detection method, even when the swing of the movable mirror portion 11 around the Y-axis does not enter a resonant state, it is possible to detect the movement of the movable mirror portion 11 around the Y-axis based on a signal output from the first signal processing circuit 71.

Second Detection Method

In a second detection method, the movement (in this example, the swing angle) of the movable mirror portion 11 around the Y-axis is estimated based on the signal output from the first signal processing circuit 71 by using a ratio between an amplitude at a resonance frequency relating to swing of the movable mirror portion 11 around the Y-axis, and an amplitude at a resonance frequency relating to swing of the frame body portion 13 around the Y-axis.

Hereinafter, the second detection method will be described in detail.

In Expression (1), when Laplace transforms of $\theta_{hh}$ and $\theta_{vh}$ are set as $X_{hh}$ and $X_{vh}$, respectively, and all of initial values are set to 0, the following Expression (2) is obtained.

$$\begin{cases} (I_{hh}s^2 + c_{hh}s + k_{hh})X_{hh} + (-c_{hh}s - k_{hh})X_{vh} = 0 \\ (-c_{hh}s - k_{hh})X_{hh} + \{I_{vh}s^2 + (c_{vh} + c_{hh})s + (k_{vh} + k_{hh})\}X_{vh} = laplace[T(t)] \end{cases} \quad (2)$$

When modifying Expression (2), the following Expression (3) is obtained.

$$\begin{cases} \begin{bmatrix} X_{hh} \\ X_{vh} \end{bmatrix} = \dfrac{1}{(I_{hh}s^2 + c_{hh}s + k_{hh}) * \{I_{vh}s^2 + (c_{vh} + c_{hh})s + (k_{vh} + k_{hh})\} - (c_{hh}s + k_{hh})^2} \\ \qquad \begin{bmatrix} c_{hh}s + k_{hh} \\ I_{hh}s^2 + c_{hh}s + k_{hh} \end{bmatrix} laplace[T(t)] \end{cases} \quad (3)$$

Here, the resonance frequencies relating to the swing of the movable mirror portion 11 and the frame body portion 13 around the Y-axis are determined by s (=jω, ω: angular frequency) when a denominator of Expression (3) becomes the minimum, respectively. As can be seen from Expression (3), the denominators of $X_{hh}$ and $X_{vh}$ are the same as each other, and thus the resonance frequency relating to the swing of the movable mirror portion 11 around the Y-axis, and the resonance frequency relating to the swing of the frame body portion 13 around the Y-axis are equal to each other.

Figure 8A:
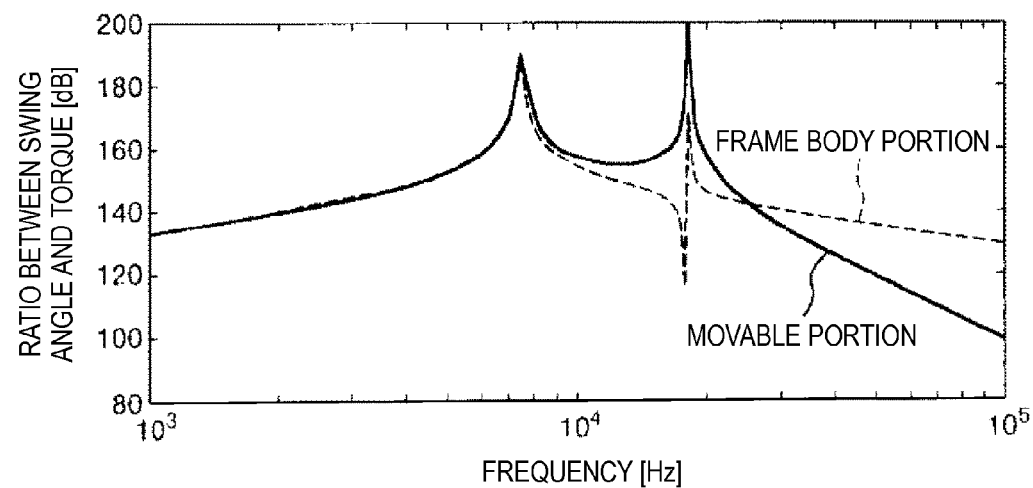
FIG. 8A is a graph illustrating frequency characteristics relating to a ratio between torque around a first axis which is applied to a frame body portion and a swing angle of a movable portion and the frame body portion around a Y-axis.
Figure 9A:
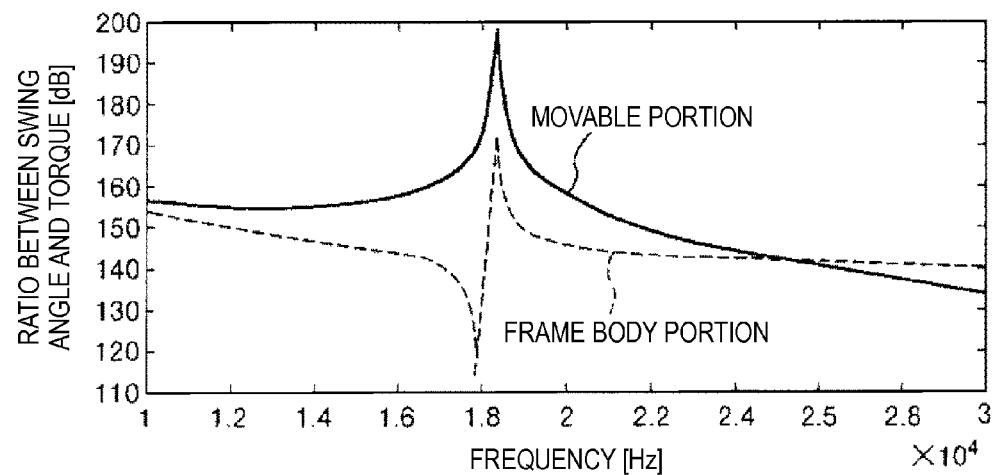
FIG. 9A is a graph obtained by enlarging the vicinity of a resonance frequency of FIG. 8A.

Specifically, frequency characteristics relating to a ratio between torque around the Y-axis which is applied to the frame body portion 13 and the swing angle of the movable mirror portion 11 and the frame body portion 13 around the Y-axis are as shown in FIG. 8A and FIG. 9A.

Figure 8B:
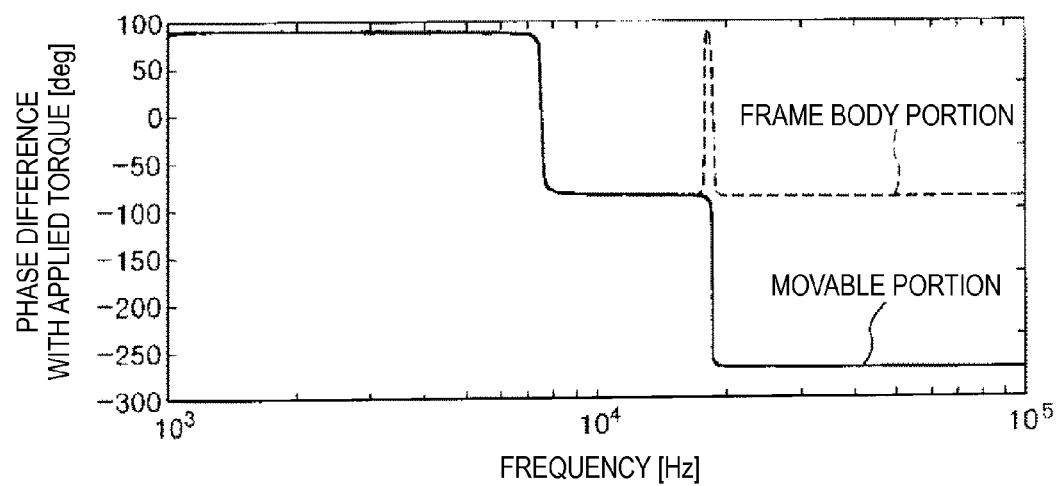
FIG. 8B is a graph illustrating frequency characteristics relating to a phase difference between torque around the first axis which is applied to the frame body portion, and swing of the movable portion and the frame body portion around the first axis.
Figure 9B:
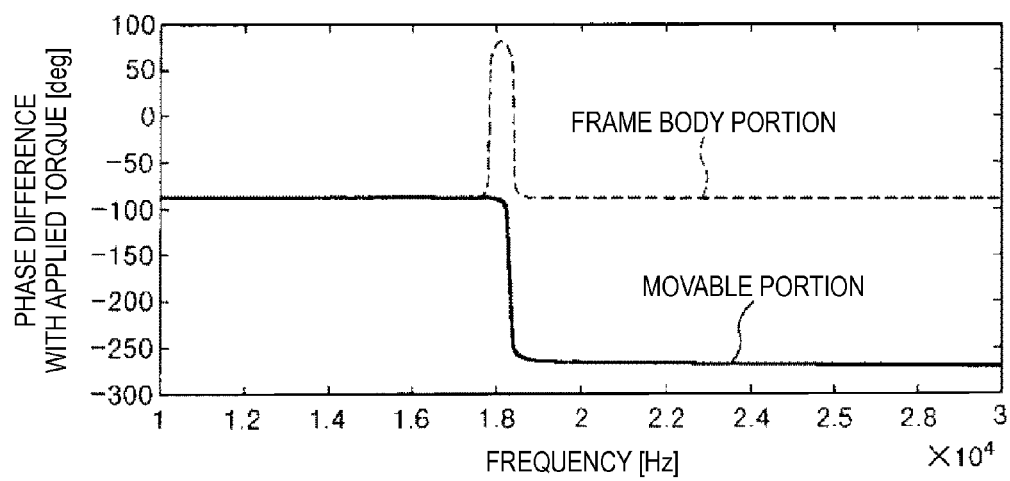
FIG. 9B is a graph obtained by enlarging the vicinity of a resonance frequency of FIG. 8B.

In addition, frequency characteristics relating to a phase difference between torque around the Y-axis which is applied to the frame body portion 13, and the swing of the movable mirror portion 11 and the frame body portion 13 around the Y-axis are as shown in FIG. 8B and in FIG. 9B.

In addition, FIG. 8A shows a graph illustrating frequency characteristics relating to a ratio between torque around a first axis which is applied to the frame body portion and a swing angle of the movable portion and the frame body portion around a Y-axis. FIG. 8B shows a graph illustrating frequency characteristics relating to a phase difference between torque around the first axis which is applied to the frame body portion, and swing of the movable portion and the frame body portion around the first axis. In addition, FIG. 9A shows a graph obtained by enlarging the vicinity of a resonance frequency of FIG. 8A, and FIG. 9B is a graph obtained by enlarging the vicinity of a resonance frequency of FIG. 8B.

However, the swing of the movable mirror portion 11 and the frame body portion 13 around the Y-axis appears as a tensile stress of the shaft portions 14a and 14b. Accordingly, it is possible to determine whether or not the movable mirror portion 11 enters a resonant state relating to the swing around the Y-axis based on a detection signal of the strain detection element 51 disposed at the shaft portion 14a. More specifically, it is possible to determine whether or not the movable mirror portion 11 enters the resonant state relating to the swing around the Y-axis based on a phase difference between the torque around the Y-axis which is applied to the frame body portion 13, and the swing of the movable mirror portion 11 and the frame body portion 13 around the Y-axis.

When estimating the swing angle (deviation angle) of the movable mirror portion 11 based on a detection signal of the strain detection element 51, a response of the strain detection element 51 may be multiplied by a ratio between an amplitude of the movable mirror portion 11 around the Y-axis in a resonant state relating to the swing of the movable mirror portion 11 around the Y-axis and an amplitude of the frame body portion 13 around the Y-axis.

In a case where the ratio varies due to temperature variation, a temperature sensor is provided in the vicinity of the optical scanner 1, and the ratio may be corrected in accordance with a temperature that is detected by the temperature sensor.

According to the second detection method as described above, the movement of the movable mirror portion around the Y-axis can be accurately detected with a relatively simple configuration based on a signal output from the first signal processing circuit 71.

According to the optical scanner 1 as described above, it is possible to detect the movement of the movable mirror portion 11 around the Y-axis and the X-axis based on the detection signal of the strain detection elements 51 and 52 which are disposed at the shaft portions 14a and 14b. Further, since the strain detection elements 51 and 52 are disposed only at the shaft portions 14a and 14b, it is not necessary to dispose an interconnection (not shown) which is connected to the strain detection elements 51 and 52 at the shaft portions 12a and 12b or throughout the entire region of the shaft portions 14a and 14b in a longitudinal direction. Accordingly, it is possible to suppress disconnection of the interconnection.

The optical scanner 1 as described above is appropriately applicable to an optical scanner which is provided to an image display device, for example, a display for imaging such as a projector, a head-up display (HUD), a head-mounted display (HMD). These image display devices are excellent in reliability, and thus can display an image with high quality.

Embodiment of Image Display Device

Figure 10:
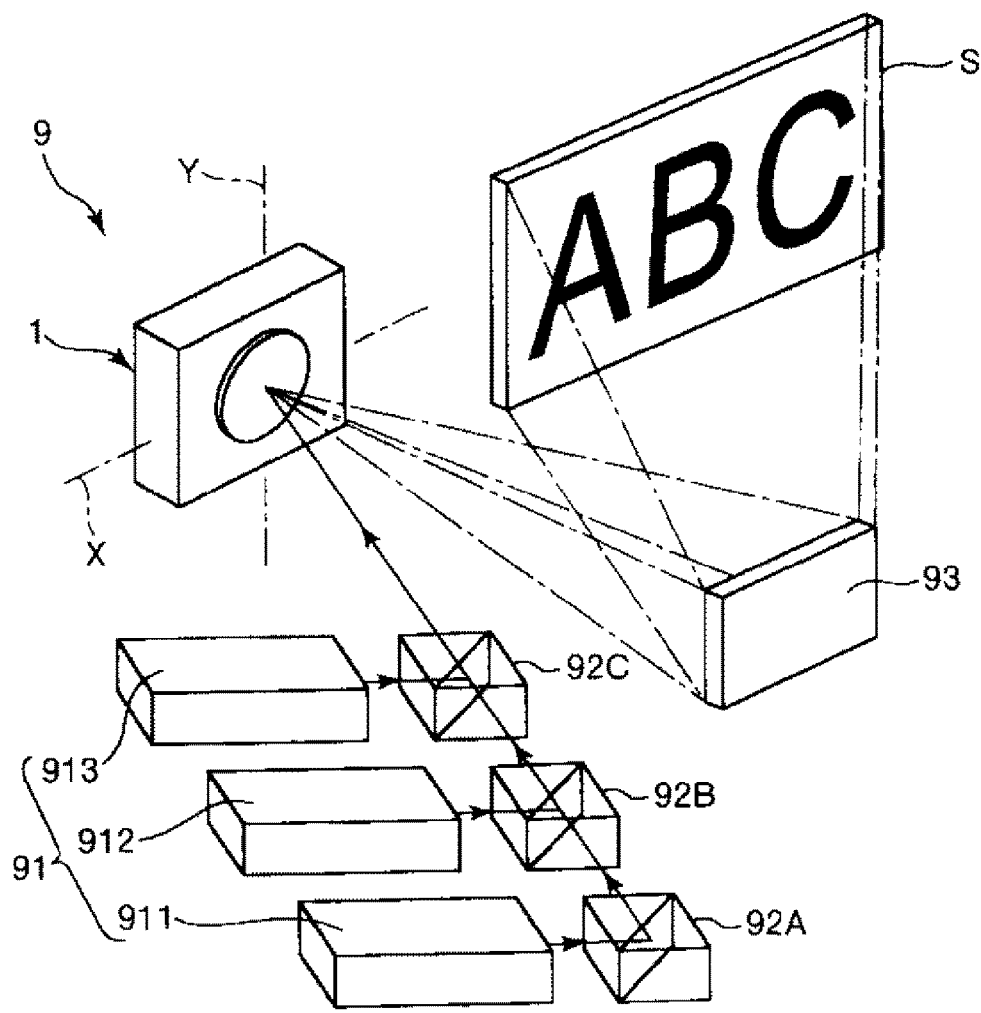
FIG. 10 is a view schematically illustrating an embodiment of an image display device according to the invention.
Figure 11:
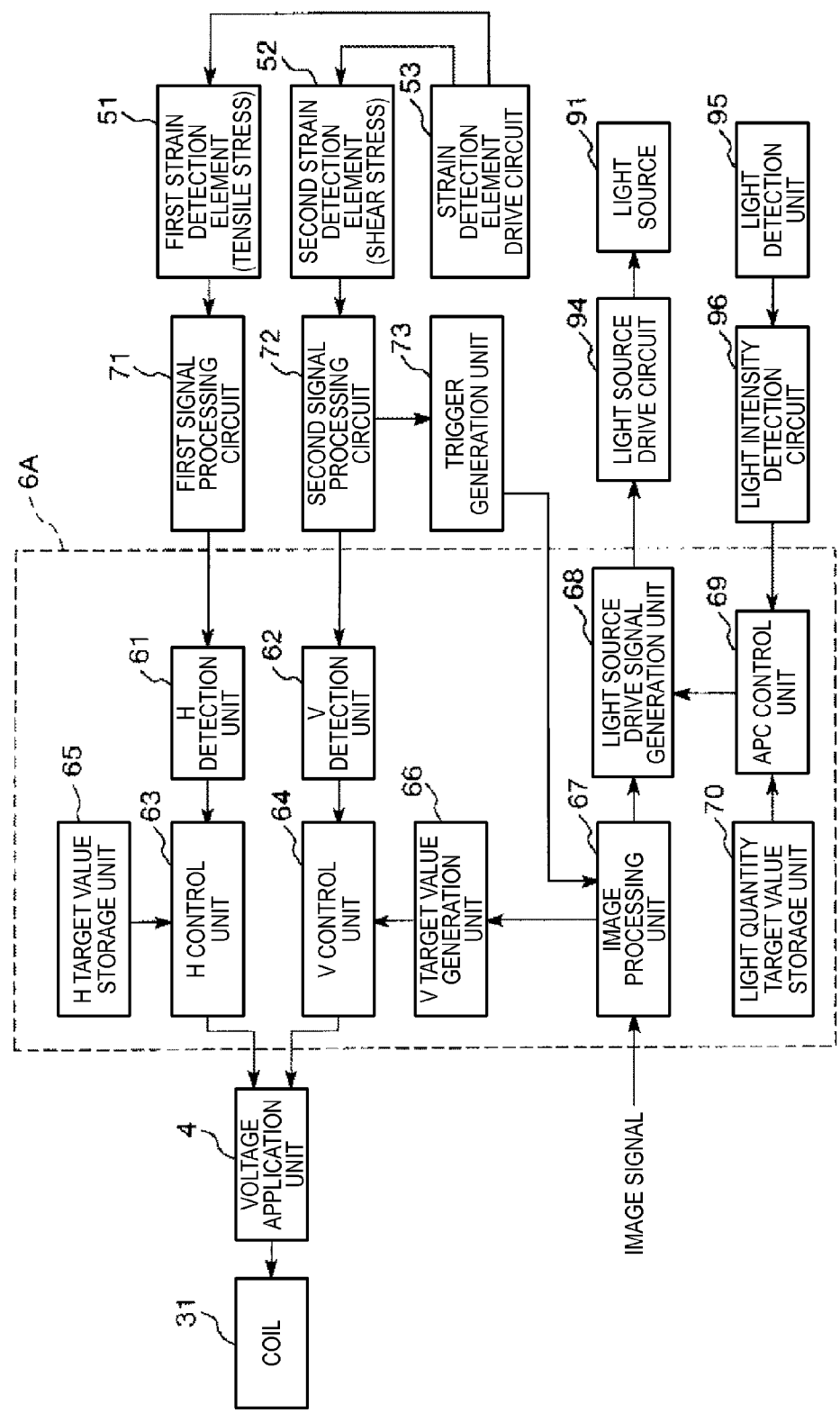
FIG. 11 is a block diagram illustrating a control system of the image display device shown in FIG. 10.

FIG. 10 shows a view schematically illustrating an embodiment of an image display device according to the invention, and FIG. 11 shows a block diagram illustrating a control system of the image display device shown in FIG. 10. In addition, in FIG. 11, the same reference numerals are given to the same configuration as that described above.

In this embodiment, the description will be made with respect to a case where the optical scanner 1 is used as an optical scanner of a display for imaging as an example of the image display device. In addition, a longitudinal direction of a screen S is set as a "horizontal direction", and a direction perpendicular to the longitudinal direction is set as a "vertical direction." In addition, the X-axis is parallel with the horizontal direction of the screen S, and the Y-axis is parallel with the vertical direction of the screen S.

An image display device (projector) 9 includes a light source device (light source) 91 which emits light such as laser, a plurality of dichroic mirrors 92A, 92B, and 92C, an optical scanner 1, a light source drive circuit 94, a light detection unit 95, a light intensity detection circuit 96, a control unit 6A, and a trigger generation unit 73.

The trigger generation unit 73 generates a signal for generating a trigger for initiation of drawing in a horizontal scanning direction based on a signal output from the second signal processing circuit. For example, the trigger generation unit 73 is a comparator.

The control unit 6A includes an image processing unit 67, a light source drive signal generation unit 68, an APC control unit 69, and a light quantity target value storage unit 70.

An image signal is input to the image processing unit 67, and the image processing unit 67 generates a drawing signal for drawing based on the image signal. The image processing unit 67 outputs the drawing signal to the light source drive signal generation unit 68 based on a signal output from the trigger generation unit 73. In addition, the image processing unit 67 outputs line information in a vertical scanning direction to the V target value generation unit 66.

The light source drive signal generation unit 68 generates a drive signal that drives the light source drive circuit 94 based on a drawing signal output from the image processing unit 67. An association between the drawing signal transmitted from the image processing unit 67 and the drive signal for the light source drive circuit 94 is periodically updated based on a signal transmitted from the APC control unit 69.

The APC control unit 69 outputs a signal, which corrects the association in order for correspondence between light emission intensity of the light source device 91 and data of an image signal to be a target value without depending on environmental variation, to the light source drive signal generation unit 68.

The light source drive circuit 94 generates a drive current that drives the light source device 91 based on the drive signal transmitted from the light source drive signal generation unit 68.

The light intensity detection circuit 96 converts an output, which is output from the light detection unit 95 such as a photodiode which detects light emission intensity of the light source device 91, to a signal for signal processing. The light intensity detection circuit 96 includes, for example, an amplification circuit, a filter, an AD converter, and the like.

The light source device 91 includes a red light source device 911 which emits red light, a blue light source device 912 which emits blue light, and a green light source device 913 which emits green light.

The respective dichroic mirrors 92A, 92B, and 92C are optical elements which combine light beams emitted from each of the red light source device 911, the blue light source device 912, and the green light source device 913.

The image display device 9 combines light beams, which are emitted from the light source device 91 (the red light source device 911, the blue light source device 912, and the green light source device 913) based on image information (image signal) transmitted from a host computer (not shown) by using the dichroic mirrors 92A, 92B, and 92C, and the resultant combined light beam is two-dimensionally scanned by the optical scanner 1 to form a color image on the screen S.

During the two-dimensional scanning, light reflected by the light reflection portion 114 due to rotation of the movable mirror portion 11 of the optical scanner 1 around the Y-axis is scanned (mainly scanned) in the horizontal direction of the screen S. On the other hand, light reflected by the light reflection portion 114 due to rotation of the movable mirror portion 11 of the optical scanner 1 around the X-axis is scanned (sub-scanned) in the vertical direction of the screen S.

In addition, FIG. 10 shows a configuration in which light beam combined by the dichroic mirror 92A, 92B, and 92C is two-dimensionally scanned by the optical scanner 1 and is reflected by a fixed mirror 93, and then an image is formed on the screen S. However, the fixed mirror 93 may be omitted, and light which is two-dimensionally scanned by the optical scanner 1 may be directly emitted onto the screen S.

Hereinafter, an application example of the image display device will be described.

First Application Example of Image Display Device

Figure 12:
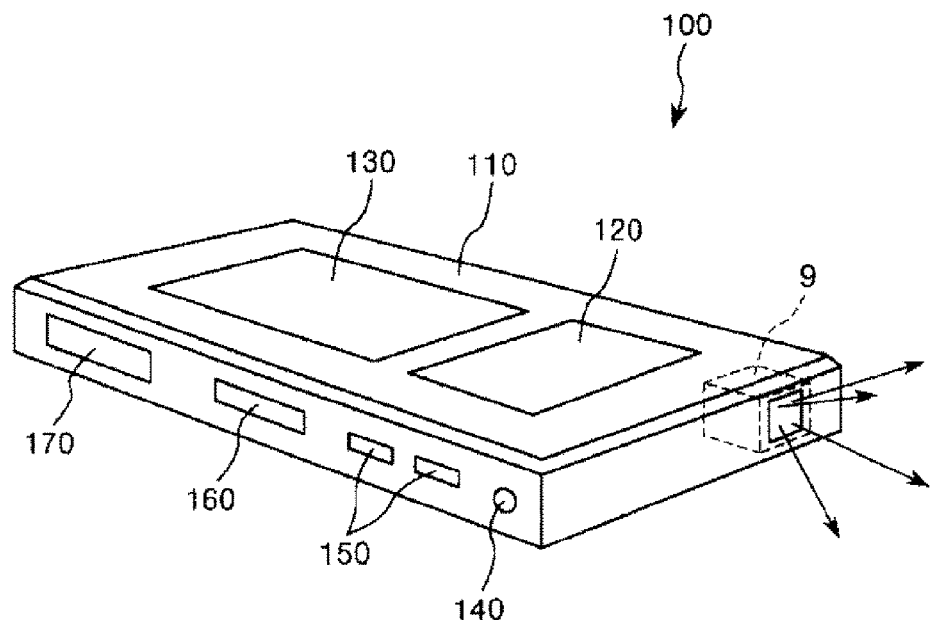
FIG. 12 is a perspective view illustrating Application Example 1 of the image display device according to the invention.

FIG. 12 shows a perspective view illustrating a first application example of the image display device according to the invention.

As shown in FIG. 12, the image display device 9 is applicable to a portable image display device 100.

The portable image display device 100 includes a casing 110 which is formed in dimensions that can be gripped with hand, and the image display device 9 which is embedded in the casing 110. It is possible to display a predetermined image on a screen, or a predetermined plane, for example, on a desk by using the portable image display device 100.

In addition, the portable image display device 100 includes a display 120 on which predetermined information is displayed, a key pad 130, an audio port 140, a control button 150, a card slot 160, and an AV port 170.

In addition, the portable image display device 100 may have other functions such as a call function and a GPS receiving function.

Second Application Example of Image Display Device

Figure 13:
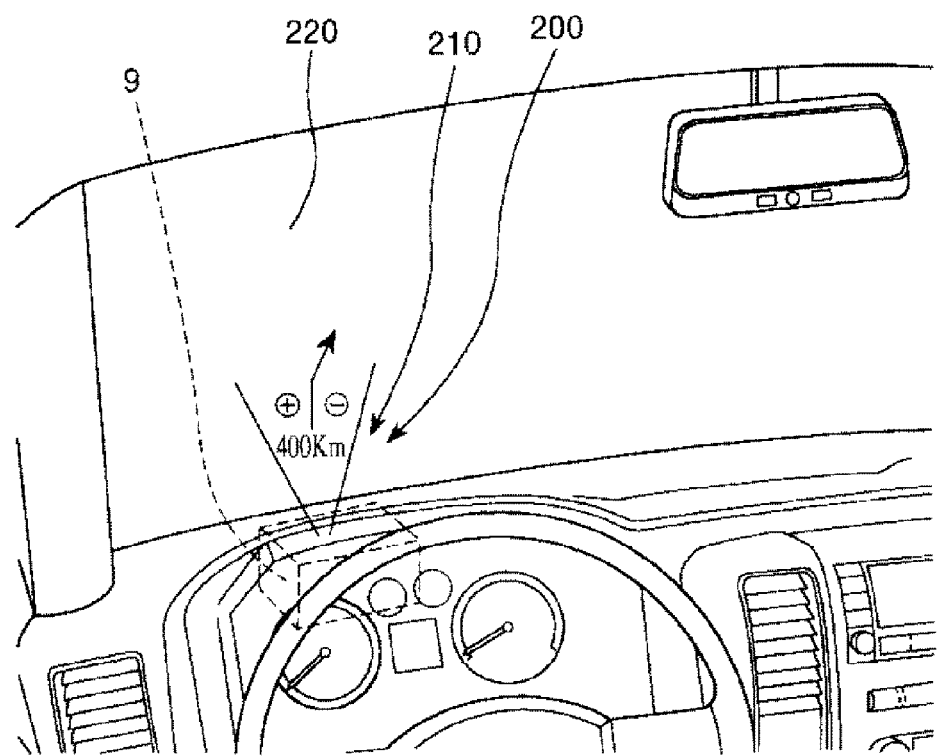
FIG. 13 is a perspective view illustrating Application Example 2 of the image display device according to the invention.

FIG. 13 shows a perspective view illustrating a second application example of the image display device according to the invention.

As shown in FIG. 13, the image display device 9 is applicable to a head-up display system 200.

In the head-up display system 200, the image display device 9 is mounted on a dashboard of a vehicle to constitute a head-up display 210. It is possible to display a predetermined image such as a guide display to a destination on a front glass 220 by using the head-up display 210.

In addition, the head-up display system 200 is applicable to, for example, an airplane, a ship, and the like without limitation to any vehicle.

Third Application Example of Image Display Device

Figure 14:
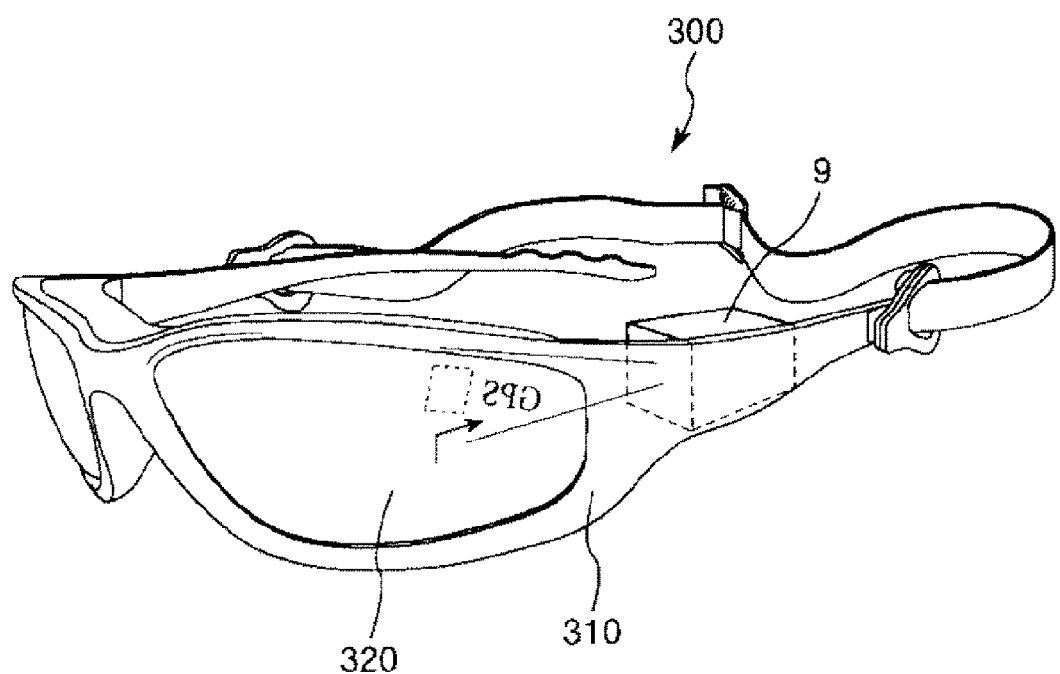
FIG. 14 is a perspective view illustrating Application Example 3 of the image display device according to the invention.

FIG. 14 shows a perspective view illustrating a third application example of the image display device according to the invention.

As shown in FIG. 14, the image display device 9 is applicable to a head-mounted display 300.

That is, the head-mounted display 300 includes eyeglasses 310, and the image display device 9 which is mounted on the eyeglasses 310. In addition, a predetermined image, which is visually recognized by one eye, is displayed by the image display device 9 at a display portion 320 which is provided to an original lens portion of the eyeglasses 310.

The display portion 320 may be transparent or may be opaque. In a case where the display portion 320 is transparent, information from the image display device 9 may be used in addition to information from the actual world.

In addition, two image display devices 9 may be provided to the head-mounted display 300 to display an image, which is visually recognized by both eyes, on two display portions.

Hereinbefore, the description has been made with respect to the optical scanner, the actuator, the image display device, and the head-mounted display according to the invention based on the embodiment shown in the drawings, but the invention is not limited thereto. For example, in the optical scanner, the image display device, and the head-mounted display according to the invention, the configuration of each component may be substituted with an arbitrary configuration having the same function, and other arbitrary configurations may be added.

In addition, the invention may employ a combination of two or more arbitrary configurations (characteristics) of each embodiment described above.

In addition, in the above-described embodiment, the description has been made with respect to a case where a moving magnet type is employed as a drive type of the optical scanner or the actuator as an example, but the invention is not limited thereto and is applicable to an optical scanner or an actuator which employs a moving coil type. In addition, the invention is not limited to the electromagnetic drive type such as the moving magnet type or the moving coil type, and is applicable to other drive types such as a piezoelectric drive type and an electrostatic drive type.

In addition, in the above-described embodiment, the description has been made with respect to a case where two (a pair) first shaft portions are provided, but there is no limitation thereto. For example, four (two pairs) or more first shaft portions may be provided.

In addition, in the above-described embodiment, the description has been made with respect to a case where the two (a pair) second shaft portions are provided as an example, but there is no limitation thereto. For example, four (two pairs) or more second shaft portions may be provided.

In addition, in the above-described embodiment, the description has been made with respect to a case where the light reflection plate covers the entirety of the first shaft portions, the entirety of the frame body portion, and the entirety of the second shaft portions in a plan view as an example. However, as long as at least apart of the first shaft portions (an end of the movable mirror portion on a base portion side) is covered with the light reflection plate in a plan view, effects such as miniaturization of the optical device described above, an increase in an area of the light reflection plate, suppressing of bending of the light reflection plate, and suppressing of stray light due to an end of the first shaft portion on a base portion side may be obtained.

In addition, in the above-described embodiment, the description has been made with respect to a case where the light reflection plate and the spacer are formed by processing the SOI substrate as an example, but there is no limitation thereto. For example, the light reflection plate and the spacer may be formed from another substrate.

In addition, the spacer between the light reflection plate and the base portion may be a solder ball. In this case, for example, a metal film may be formed on surfaces of the light reflection plate and the base portion on a spacer side, respectively, and the metal films may be bonded through the solder ball.

In addition, in the above-described embodiment, the description has been made with respect to a case where the light reflection portion is provided to the light reflection plate as an example, but there is no limitation thereto. For example, the light reflection plate may be omitted, and the light reflection portion may be provided to the base portion (movable portion).

In addition, the arrangement, the number, the shape, and the size of the first strain detection element, and the number of terminals are not limited to the above-described embodiment as long as the bending deformation of the second shaft portion can be detected, and a strain detection element known in the related art may be used as the first strain detection element. For example, two two-terminal type piezoresistive elements similar to the strain detection element 51 of the above-described embodiment may be disposed to line up in a width direction of the second shaft portion. In this case, a torsional deformation component which is included in a detection signal of one piezoresistive element and a torsional deformation component which is included in a detection signal of the other piezoresistive element may cancel each other, and thus only a bending deformation component may be output.

In addition, the arrangement, the number, the shape, and the size of the second strain detection element, and the number of terminals are not limited to the above-described embodiment as long as the torsional deformation of the second shaft portion can be detected, and a strain detection element known in the related art may be used as the second strain detection element. For example, the second strain detection element may be configured in such a manner that two two-terminal type piezoresistive elements are disposed to line up in a width direction of the second shaft portion. In this case, a bending deformation component which is included in a detection signal of one piezoresistive element and a bending deformation component which is included in a detection signal of the other piezoresistive element may cancel each other, and thus only a torsional deformation component may be output.

The entire disclosure of Japanese Patent Application No. 2013-055728 filed Mar. 18, 2013 is expressly incorporated by reference herein.

What is claimed is:

1. An optical scanner, comprising:
a movable member having a light reflection portion having a light reflection property, the movable member being configured to swing around a first axis;
a frame body configured to swing around a second axis intersecting the first axis;
a first shaft which connects the movable member and the frame body;
a fixing member;
a second shaft which connects the frame body and the fixing member;
a first strain detection element which is disposed at the second shaft and detects deformation of the second shaft; and
a first signal processing unit to which a detection signal of the first strain detection element is input and which outputs a signal based on bending deformation of the second shaft,
wherein movement of the movable member around the first axis is detected based on the signal output from the first signal processing unit, and
wherein the movement of the movable member around the first axis is estimated based on the signal output from the first signal processing unit by using a ratio between an amplitude at a resonance frequency relating to swinging of the movable member around the first axis, and an amplitude at a resonance frequency relating to swinging of the frame body around the first axis.

2. The optical scanner according to claim 1,
wherein the first strain detection element includes a piezoresistive region having a rectangular shape extending in a direction along a longitudinal direction of the second shaft, and a pair of terminals collinearly disposed in a line on the piezoresistive region in a direction along the longitudinal direction of the second shaft.

3. An image display device, comprising:
the optical scanner according to claim 2; and
a light source that emits light,
wherein light emitted from the light source is reflected by the light reflection portion to display an image.

4. A head-mounted display, comprising:
the optical scanner according to claim 2; and
a light source that emits light,
wherein light emitted from the light source is reflected by the light reflection portion to display an image as a virtual image.

5. The optical scanner according to claim 1,
wherein the first strain detection element is disposed at an end of the second shaft proximate the fixing member.

6. An image display device, comprising:
the optical scanner according to claim 5; and
a light source that emits light,
wherein light emitted from the light source is reflected by the light reflection portion to display an image.

7. A head-mounted display, comprising:
the optical scanner according to claim 5; and
a light source that emits light,
wherein light emitted from the light source is reflected by the light reflection portion to display an image as a virtual image.

8. The optical scanner according to claim 1,
wherein the movement of the movable member around the first axis is estimated based on the signal output from the first signal processing unit.

9. An image display device, comprising:
the optical scanner according to claim 8; and
a light source that emits light,
wherein light emitted from the light source is reflected by the light reflection portion to display an image.

10. A head-mounted display, comprising:
the optical scanner according to claim 8; and
a light source that emits light,
wherein light emitted from the light source is reflected by the light reflection portion to display an image as a virtual image.

11. The optical scanner according to claim 1, further comprising:
a second strain detection element which is disposed at the second shaft and detects deformation of the second shaft; and
a second signal processing unit to which a detection signal of the second strain detection element is input and which outputs a signal based on torsional deformation of the second shaft.

12. The optical scanner according to claim 11,
wherein movement of the movable member around the second axis is detected based on the signal output from the second signal processing unit.

13. An image display device, comprising:
the optical scanner according to claim 11; and
a light source that emits light,
wherein light emitted from the light source is reflected by the light reflection portion to display an image.

14. A head-mounted display, comprising:
the optical scanner according to claim 11; and
a light source that emits light,
wherein light emitted from the light source is reflected by the light reflection portion to display an image as a virtual image.

15. An image display device, comprising:
the optical scanner according to claim 1; and
a light source that emits light,
wherein light emitted from the light source is reflected by the light reflection portion to display an image.

16. A head-mounted display, comprising:
the optical scanner according to claim 1; and
a light source that emits light,
wherein light emitted from the light source is reflected by the light reflection portion to display an image as a virtual image.

17. An optical scanner, comprising:
a movable member having a light reflection portion having a light reflection property, the movable member being configured to swing around a first axis;
a frame body configured to swing around a second axis intersecting the first axis;
a first shaft which connects the movable member and the frame body;
a fixing member; and
a second shaft which connects the frame body and the fixing member,
wherein a strain detection element is only disposed at the second shaft, wherein movement of the movable member around the first axis is detected based on a signal output from a first signal processing unit to which a detection signal of the first strain detection element is input, and wherein the movement of the movable member around the first axis is estimated based on the signal output from the first signal processing unit by using a ratio between an amplitude at a resonance frequency relating to swinging of the movable member around the first axis, and an amplitude at a resonance frequency relating to swinging of the frame body around the first axis.

18. An image display device, comprising:
the optical scanner according to claim 17; and
a light source that emits light,
wherein light emitted from the light source is reflected by the light reflection portion to display an image.

19. A head-mounted display, comprising:
the optical scanner according to claim 17; and
a light source that emits light,
wherein light emitted from the light source is reflected by the light reflection portion to display an image as a virtual image.

20. An actuator comprising:
a gimbal structure which:
  swingably supports a movable member around a first axis by a first shaft supported against a frame body on an inner side of the frame body, and
  swingably supports the frame body around a second axis intersecting the first axis by a second shaft on an outer side of the frame body; and
a strain detection element which is disposed at the second shaft and detects deformation of the second shaft,
wherein movement of the movable member around the first axis is detected using a signal which is included in a detection signal of the strain detection element and is based on bending deformation of the second shaft, and
wherein the movement of the movable member around the first axis is estimated based on the signal included in the detection signal by using a ratio between an amplitude at a resonance frequency relating to swinging of the movable member around the first axis, and an amplitude at a resonance frequency relating to swinging of the frame body around the first axis.

* * * * *